United States Patent
Nellums et al.

(10) Patent No.: US 9,020,715 B2
(45) Date of Patent: Apr. 28, 2015

(54) DISTRIBUTED HIERARCHICAL CONTROL SYSTEM FOR A TANDEM AXLE DRIVE SYSTEM

(71) Applicant: Dana Heavy Vehicle Systems Group, LLC, Maumee, OH (US)

(72) Inventors: Richard A. Nellums, Maumee, OH (US); Ananthakrishnan Surianarayanan, Lansdale, PA (US); Sameer A. Joshi, Lansdale, PA (US); Sajeev C. Krishnan, Ambler, PA (US); Daniel G. Smedley, Pleasant Lake, MI (US); Ronald K. Markyvech, Allen Park, MI (US); Sidharth Renganathan, Ambler, PA (US); Steven J. Wesolowski, Waterville, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 14/069,480

(22) Filed: Nov. 1, 2013

(65) Prior Publication Data
US 2014/0129100 A1 May 8, 2014

Related U.S. Application Data

(60) Provisional application No. 61/721,589, filed on Nov. 2, 2012, provisional application No. 61/794,302, filed on Mar. 15, 2013.

(51) Int. Cl.
*G06F 7/00* (2006.01)
*G06F 17/00* (2006.01)
(Continued)

(52) U.S. Cl.
CPC .............. *B60W 10/10* (2013.01); *B60W 10/04* (2013.01); *B60K 17/36* (2013.01); *B60K 23/08* (2013.01); *B60K 2023/0858* (2013.01); *B60W 2050/0006* (2013.01)

(58) Field of Classification Search
CPC .............................. B60W 10/04; B60W 10/10
USPC ........................................................... 701/58
See application file for complete search history.

(56) References Cited

U.S. PATENT DOCUMENTS

2003/0225495 A1* 12/2003 Coelingh et al. ................. 701/48
2011/0218715 A1*  9/2011 Duraiswamy et al. .......... 701/51

FOREIGN PATENT DOCUMENTS

| EP | 1369286 A2 | 12/2003 |
|---|---|---|
| KR | 20110050850 A | 5/2011 |
| WO | 2012100119 A1 | 7/2012 |

OTHER PUBLICATIONS

International Search Report for PCT Application No. PCT/US2013/067983.

*Primary Examiner* — Maceeh Anwari
(74) *Attorney, Agent, or Firm* — Marshall & Melhorn, LLC

(57) ABSTRACT

A hierarchical control system for a tandem axle assembly for a vehicle is provided. The hierarchical control system includes a vehicle level controller, an actuator, a shift controller, and a sensor. The shift controller is capable of placing the tandem axle assembly in at least a first operating condition and a second operating condition using the actuator. In response to the sensor and an operating condition of at least one of the power source and the transmission of the vehicle, the shift controller adjusts a manner of placing the tandem axle assembly in at least one of the first operating condition and the second operating condition. The hierarchical control system facilitates performing a shifting procedure in an automatic manner or as desired by an operator of the vehicle without excessively increasing a cost and a complexity of the tandem axle assembly.

18 Claims, 14 Drawing Sheets

(51) Int. Cl.
*G06F 19/00* (2011.01)
*B60W 10/10* (2012.01)
*B60W 10/04* (2006.01)
*B60K 17/36* (2006.01)
*B60K 23/08* (2006.01)
*B60W 50/00* (2006.01)

DISTRIBUTED HIERARCHICAL CONTROL SYSTEM FOR A TANDEM AXLE DRIVE SYSTEM

CLAIM OF PRIORITY

The present application claims the benefit of priority to U.S. Provisional Application No. 61/721,589 filed on Nov. 2, 2012 and U.S. Provisional Application No. 61/794,302 filed on Mar. 15, 2013, which are incorporated herein in their entirety by reference.

FIELD OF THE INVENTION

The present invention relates to control systems for vehicle and more specifically to control systems for tandem axle drive vehicles.

BACKGROUND OF THE INVENTION

Tandem axle assemblies are widely used on trucks and other load-carrying vehicles. The tandem axle assembly typically comprises a front axle and a rear axle. The tandem axle assembly may be designated a 6×4 tandem axle assembly when the front axle and the rear axle are drivingly engaged. The tandem axle assembly may be designated a 6×2 tandem axle assembly when either one of the front axle and the rear axle is drivingly engaged.

The 6×4 tandem axle assembly provides improved traction for road conditions having reduced traction, such as when the vehicle must traverse mud, ice, or snow. The 6×4 tandem axle assembly also provides improved traction when the operator applies an increased amount of torque to the front axle and the rear axle. Despite the benefits of improved traction, a fuel economy of the vehicle including the 6×4 tandem axle assembly is typically lower than a fuel economy of a vehicle including the 6×2 tandem axle assembly.

A tandem axle assembly may be configured to permit an operator of a vehicle or a control system of the vehicle to switch from a 6×4 mode of operation to a 6×2 mode of operation (or from the 6×2 mode of operation to the 6×4 mode of operation) as required by operating conditions. The tandem axle assembly able to switch operating modes as desired by the operator requires the operator to initiate a shifting procedure. The tandem axle assembly may also be able to switch operating modes using a control system utilizing a controller or a plurality of controllers which monitors a variety of parameters, which typically include a rotational speed of a drive shaft and a rotational speed of an axle to determine the operating mode for the vehicle and then initiate the shifting procedure.

It would be advantageous to develop a distributed hierarchical control system for a tandem axle assembly of a vehicle capable of performing a shifting procedure in an automatic manner or as desired by an operator of the vehicle without excessively increasing a cost and a complexity of the tandem axle assembly.

SUMMARY OF THE INVENTION

Presently provided by the invention, a lubricant management system for an axle housing that varies an amount of lubricant used in a sump of the axle housing in a simple and cost effective manner, has surprisingly been discovered.

In one embodiment, the present invention is directed to a hierarchical control system for a tandem axle assembly for a vehicle. The hierarchical control system includes a vehicle level controller, an actuator, a shift controller, and a sensor. The vehicle level controller is in communication with at least one of a power source and a transmission of the vehicle. The actuator is in driving engagement with a portion of the tandem axle assembly. The shift controller is in communication with the vehicle level controller and the actuator. The shift controller is capable of placing the tandem axle assembly in at least a first operating condition and a second operating condition using the actuator. The sensor is in communication with the shift controller and communicates information about an operating condition of a portion of the tandem axle assembly thereto. In response to the sensor and an operating condition of at least one of the power source and the transmission of the vehicle, the shift controller adjusts a manner of placing the tandem axle assembly in at least one of the first operating condition and the second operating condition.

In another embodiment, the present invention is directed to a hierarchical control system for a tandem axle assembly for a vehicle. The hierarchical control system comprises a vehicle level controller, an actuator, a shift controller, and a sensor. The vehicle level controller is in communication with at least one of a power source and a transmission of the vehicle. The actuator is in driving engagement with a portion of the tandem axle assembly. The shift controller is in communication with the vehicle level controller and the actuator. The shift controller is capable of placing the tandem axle assembly in at least a first operating condition and a second operating condition using the actuator. The shift controller includes a vehicle supervisor layer, a shift strategy layer, and an axle control layer. The vehicle supervisor layer monitors an operation of a dual range axle disconnect system forming a portion of the tandem axle assembly. The shift strategy layer determines a modulated shift point of the dual range axle disconnect system. The axle control layer performs steps necessary to shift the dual range axle disconnect system. The sensor is in communication with the shift controller and communicates information about an operating condition of a portion of the tandem axle assembly. The tandem axle assembly further includes a front axle and a rear axle. The dual range axle disconnect system is drivingly engaged with one of the front axle and the rear axle when the tandem axle assembly is placed in the first operating condition and the dual range axle disconnect system is drivingly engaged with both the front axle and the rear axle when the tandem axle assembly is placed in the second operating condition. In response to the sensor and an operating condition of at least one of the power source and the transmission of the vehicle, the shift controller adjusts a manner of placing the tandem axle assembly in at least one of the first operating condition and the second operating condition.

The present invention also is directed to a method of shifting a tandem axle assembly for a vehicle using a hierarchical control system. The method comprises the steps of providing the tandem axle assembly, providing a power source and a transmission of the vehicle, and providing the hierarchical control system. The tandem axle assembly includes a front axle, a rear axle, and a dual range axle disconnect system. The tandem axle assembly is able to be placed in at least a first operating condition and a second operating condition. The hierarchical control system includes a vehicle level controller in communication with at least one of the power source and the transmission, an actuator in driving engagement with a portion of the tandem axle assembly, a shift controller in communication with the vehicle level controller and the actuator, the shift controller capable of placing the tandem axle assembly in at least the first operating condition and the second operating condition using the actuator, and a sensor in communication with the shift controller. The method further comprises the steps of communicating information collected by the sensor about an operating condition of a portion of the tandem axle assembly to the shift controller, communicating information about an operating condition of at least one of the power source and the transmission of the vehicle, and adjusting a manner of placing the tandem axle assembly in at least one of the first operating condition and the second operating condition in response to the information collected by the sensor Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
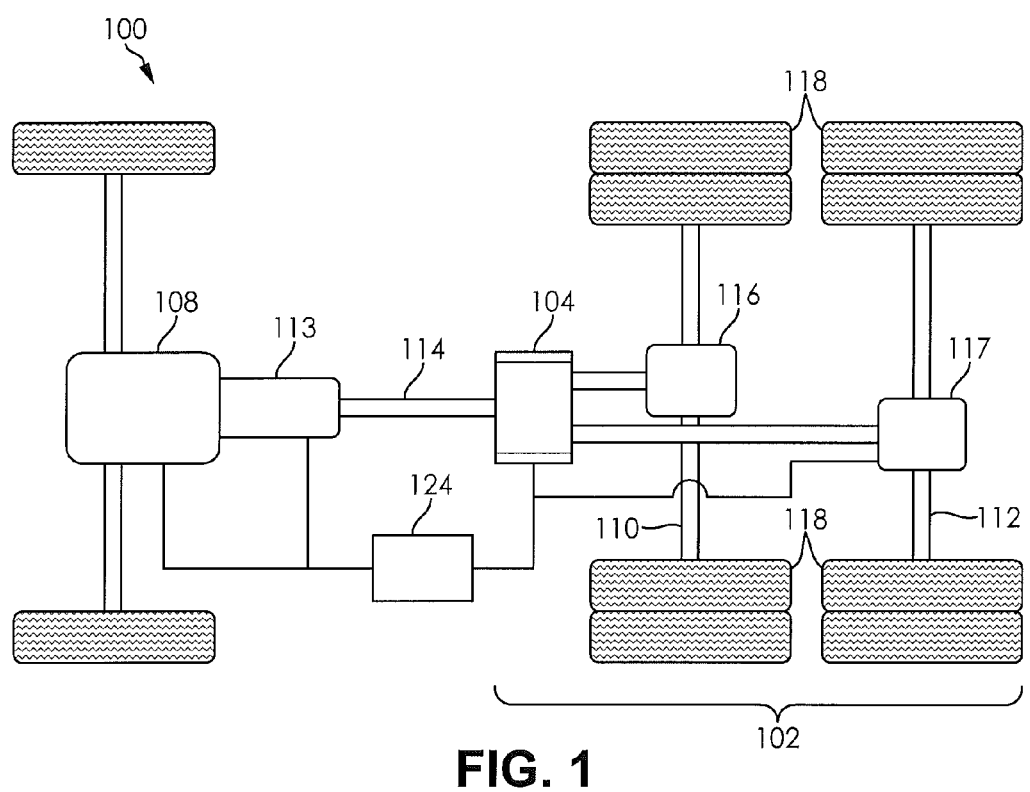
FIG. 1 is a schematic illustration of a vehicle driveline fitted with a tandem axle assembly according to an embodiment of the present invention.

FIG. 1 illustrates a vehicle driveline 100 fitted with a tandem axle assembly 102. The tandem axle assembly 102 includes a dual range axle disconnect system 104. The tandem axle assembly 102 may be operated in a first drive ratio and a second drive ratio. The dual range axle disconnect system 104 includes a planetary inter-axle differential 106 (henceforth abbreviated as PIAD, shown in FIG. 2) that transfers a driving torque from a power source 108 (for example, an internal combustion engine) to both a front axle 110 and a rear axle 112 of the tandem axle assembly 102.

A power source output shaft (not shown) is drivingly engaged with an input shaft (not shown) of a transmission 113. It is understood that the transmission 113 may be either an automatic transmission or a manual transmission. A transmission output shaft 114 is drivingly engaged with an input shaft 115 (shown in FIG. 2) of the dual range axle disconnect system 104. The input shaft 115 is drivingly engaged with the PIAD 106. The PIAD 106 divides a transmitted power between the front axle 110 and the rear axle 112 of the tandem axle assembly 102.

A first differential gear box 116 provides an exemplary axle reduction ratio of 2.64:1; however, it is understood that other ratios may be selected. A second differential gear box 117 provides an exemplary axle reduction ratio of 3.55:1; however, it is understood that other ratios may be selected. The differential gear boxes 116, 117 provide a side-to-side differential action between portions of the axles 110, 112. The portions of the axles 110, 112 are drivingly engaged with wheels 118, which provide traction to drive a vehicle (not shown) the vehicle driveline 100 is incorporated in. The PIAD 106 provides an effective final drive ratio of 3.1:1 in a 6×4 mode of operation and 2.64:1 in a 6×2 mode of operation; however, it is understood that the tandem axle assembly 102 may be configured for other drive ratios. Further, as a non-limiting example, the differential gear boxes 116, 117 may have identical reduction ratios, and therefore the PIAD 106 may not be needed. Additionally, it is understood that an axle ratio reduction of the tandem axle assembly 102 may occur at another portion of each of the axles 110, 112 besides the differential gear boxes 116, 117.

Figure 2:
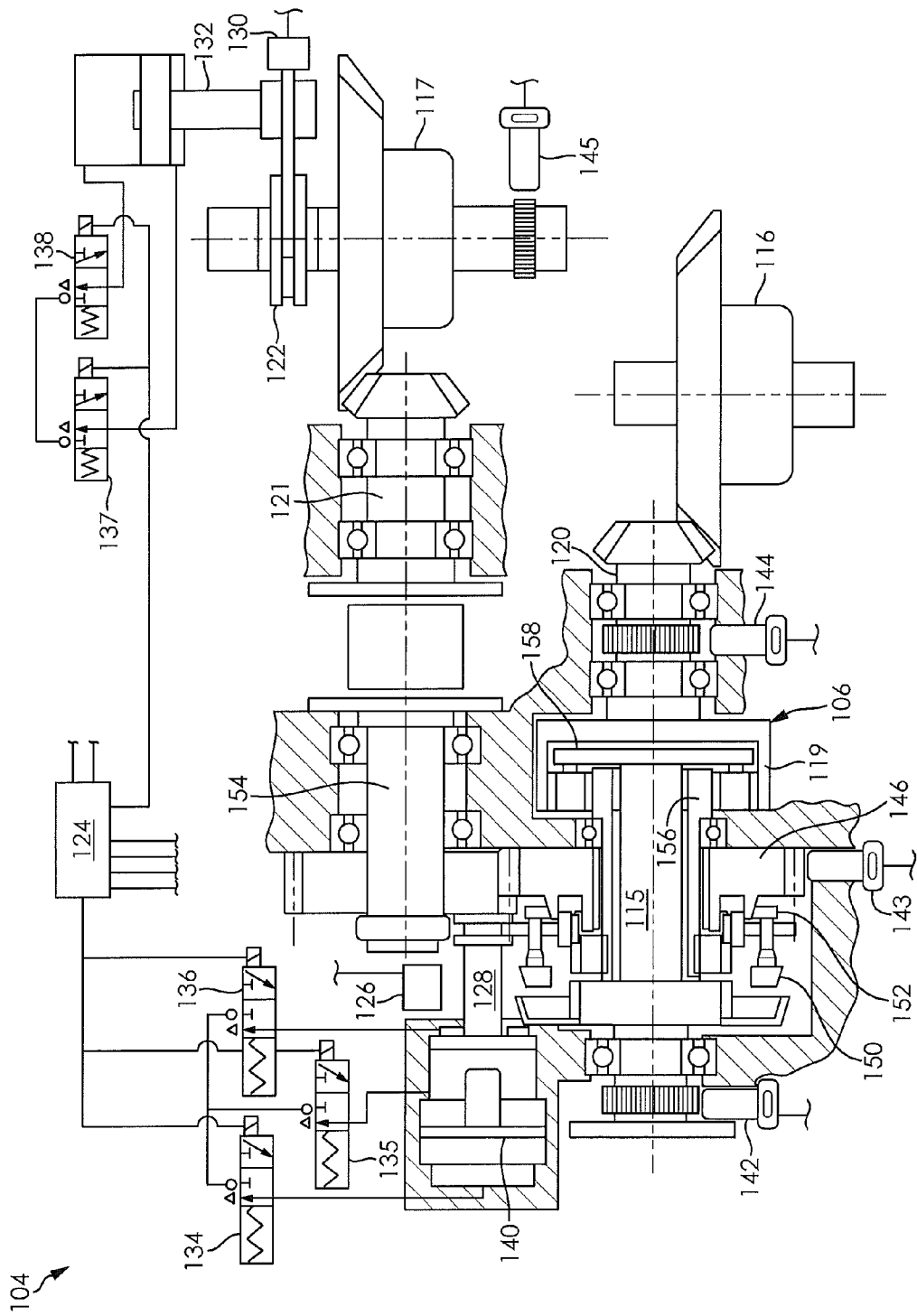
FIG. 2 is a schematic illustration of a dual range axle disconnect system including a planetary inter-axle differential and an axle disconnect device, the dual range axle disconnect system forming a portion of the tandem axle assembly illustrated in FIG. 1.

As shown in FIG. 2, the dual range axle disconnect system 104 includes the input shaft 115 that receives an output torque from the power source 108. A ring gear 119 of the PIAD 106 is drivingly engaged with a front axle input shaft 120 for transferring a driving torque from the PIAD 106 to the front axle 110; however, it is understood that the PIAD 106 may have other arrangements and that the dual range axle disconnect system 104 is not limited to the embodiment illustrated in FIG. 2. The input 115 shaft of the PIAD 106 can be selectively engaged with or disconnected from a rear axle input shaft 121 under certain conditions to provide the 6×4 mode of operation or the 6×2 mode of operation.

Selection of one of the 6×4 mode of operation and the 6×2 mode of operation results in the tandem axle assembly 102 being placed in the first drive ratio or the second drive ratio. Further, the dual range axle disconnect system 104 includes an axle disconnect device 122 which is used to drivingly disengage a portion of the rear axle 112 from the dual range axle disconnect system 104. Drivingly disengaging a portion of the rear axle 112 from the dual range axle disconnect system 104 prevents the rear axle 112 from back-driving the PIAD 106 in the 6×2 mode of operation, which results in decreased friction losses and decreased parasitic losses.

As mentioned hereinabove the dual range axle disconnect system 104 may be placed in the first drive ratio or the second drive ratio. When in a higher effective numeric drive ratio (as a non-limiting example, the higher effective numeric drive ratio may be 3.1:1), the dual range axle disconnect system 104 is operating in the 6×4 mode of operation, and both the front axle 110 and the rear axle 112 provide a traction force for the vehicle the vehicle driveline 100 is incorporated in. When in a lower numeric drive ratio (as a non-limiting example, the lower effective numeric drive ratio may be 2.64:1), the dual range axle disconnect system 104 is operating in the 6×2 mode of operation, and only the front axle 110 provides a traction force for the vehicle the vehicle driveline 100 is incorporated in; however, it is understood that the vehicle driveline 100 may be configured to drive the rear axle 112 in the 6×2 mode of operation. The vehicle will typically be in the 6×4 mode of operation during a vehicle start and a vehicle acceleration (up to a cruising speed). A controller 124 in communication with the dual range axle disconnect system 104 determines an optimal condition for engagement or disengagement of the rear axle 112 in the dual range axle disconnect system 104. It is understood that the controller 124 may comprise a plurality of controllers in communication with one another.

In an automatic mode (which may also be referred to as a premium dual range disconnect mode), once a cruising speed is reached, the tandem axle assembly 102 is shifted to the 6×2 mode of operation, which has the lower numeric drive ratio. Additionally, a control logic of the controller 124 can be modified to solely engage or disengage the axle disconnect device 122 without disconnecting the rear axle input shaft 121. Such a mode of operation, which may be referred to as an engage/disengage mode, may also be used for a recovery procedure.

When the dual range axle disconnect system 104 is paired with a manual transmission or an on demand axle engagement/disengagement system, the dual range axle disconnect system 104 waits for an operator of the vehicle to initiate a shifting procedure. The dual range axle disconnect system 104 also provides the ability for a shift into the 6×2 mode of operation to be performed at a lower transmission gear, allowing subsequent transmission shifts to occur after the shift of the dual range axle disconnect system 104. Such features apply to both the premium dual range disconnect mode and the shift from the 6×4 mode of operation to the 6×2 mode of operation.

It is understood that the term axle upshift, depending on the context of usage, may be used to refer to the premium dual range disconnect mode, for example, in disconnecting both the axle disconnect device 122 and the rear axle input shaft 121 or the on demand axle engagement/disengagement system in which only the axle disconnect device 122 is disengaged. The state of the vehicle after the axle upshift has occurred is the 6×2 mode of operation. Similarly, the term axle downshift refers to both the premium dual range disconnect mode, for example, in engaging both the axle disconnect device 122 and restoring drive to the rear axle input shaft 121 or the on demand axle engagement/disengagement system downshift in which only the axle disconnect device 122 is engaged. The state of the vehicle after the downshift is completed is the 6×4 mode of operation.

The dual range axle disconnect system is illustrated in FIG. 2. A range position sensor 126 outputs a fixed frequency, variable duty rate signal that can be used to measure an actual position of a master actuator 128. The rear axle 112 includes a switch 130 that indicates an engagement status of the axle disconnect device 122. The axle disconnect device may be dog clutch; however, it is understood that other types of clutches may be used.

The master actuator 128 and a rear axle actuator 132 are double sided pneumatic actuators each having an inlet controlled by a plurality of solenoid valves 135, 136, 137, 138. A front axle slave actuator 140 is a pneumatic actuator having an inlet controlled by the solenoid valve 134. Further, a position of the front axle slave actuator 140 may also be adjusted using the solenoid valve 135 or by the solenoid valve 136 through the master actuator 128. The front axle slave actuator 140 has a diameter larger than the master actuator 128 and holds the master actuator 128 in an intermediate position allowing a neutral state in which synchronization can occur. The actuators 128, 140 maintain their states when the solenoid valves 134, 135, 136 are turned off. A plurality of sensors 142, 143, 144, 145 are speed sensors which are respectively used to measure a rotational speed of the input shaft 115, a step-up gear 146, the front axle input shaft 120, and the rear axle 112. The dual range axle disconnect system 104 further includes a front synchronizer 150 and a rear synchronizer 152.

To facilitate optimal operation of the dual range axle disconnect system 104, a shift strategy is implemented. In the automatic mode, the dual range axle disconnect system 104 must shift from the 6×4 mode of operation to the 6×2 mode of operation and back again when the appropriate operating conditions are met. For the shift from the 6×4 mode of operation to the 6×2 mode of operation, an exemplary situation when the conditions are met may be when a speed of the vehicle the vehicle driveline 100 is incorporated in is greater than a set speed, when a torque demand for the power source 108 is stabilized within a set range, when the transmission 113 is at an allowed ratio setting, and when the dual range axle disconnect system 104 is confident the shift can be accomplished. Further, it is understood that other conditions related to ambient temperature and driver demand may also apply.

Once such conditions are met, the dual range axle disconnect system 104 is shifted from the 6×4 mode of operation to the 6×2 mode of operation. To accomplish this, the dual range axle disconnect system 104 creates a torque reversal in the vehicle driveline 100 and the actuators 128, 132, 140 are commanded to transition the dual range axle disconnect system 104 to the 6×2 mode of operation.

For a shift from the 6×2 mode of operation to the 6×4 mode of operation, the conditions to command the shift occur when a speed of the vehicle the vehicle driveline 100 is incorporated in has dropped below a set speed, the transmission 113 is at an allowed ratio setting, a demand by the operator of the vehicle has been stable, and when the dual range axle disconnect system 104 is confident the shift can be accomplished.

When the dual range axle disconnect system 104 is paired with the manual transmission or the on demand axle engagement/disengagement system, the operator of the vehicle is able to command the dual range axle disconnect system 104 to shift from the 6×4 mode of operation to the 6×2 mode of operation and vice-versa using a dashboard switch, for example.

In the case of the engage/disengage mode used with the axle disconnect device 122, the conditions to be met for performing the shift remain the same. Unlike the automatic mode, in the engage/disengage mode only the axle disconnect device 122 of the rear axle 112 of the tandem axle assembly 102 is disconnected and the rear axle input shaft 121 remains drivingly engaged with the power source 108 through the PIAD 106.

An exemplary embodiment of the shift strategy from 6×4 mode of operation to the 6×2 mode of operation for the vehicle equipped with the dual range axle disconnect system 104 will now be described. It is understood that the following steps apply to the dual range axle disconnect system 104 operating in the automatic mode and when the dual range axle disconnect system 104 is paired with the manual transmission or the on demand axle engagement/disengagement system.

Firstly, a command is sent by the controller 124 for a torque break, and a signal is sent to disengage the front axle 110 and the rear axle 112.

In the automatic mode, the following steps need to be performed to implement the shift strategy:

The actuators 128, 132, 140 are placed in a fully pressurized or depressurized state before the torque break is implemented The synchronizers 150, 152 or the axle disconnect device 122 is not moved to release a component of the dual range axle disconnect system 104 until the torque break occurs The power source 108, the transmission 113, or both the power source 108 and the transmission 113 are manipulated to cause a torque reversal in the vehicle driveline 100

Upon disengagement of the PIAD 106, synchronization of the input shaft 115 to the front axle input shaft 120 may begin Upon disengagement of the rear axle 112 using the axle disconnect device 122, a rear axle output shaft 154 is disconnected from the PIAD 106

Once the PIAD 106 is synchronized and locked for the 6×2 mode of operation, the rear axle output shaft 154 is disconnected As the rear axle input shaft 121 and the second differential gear box 117 are not drivingly engaged with the PIAD 106, the rear axle input shaft 121 and the second differential gear box 117 are free to stop rotating The wheels drivingly engaged with the front axle drive the first differential gear box 116 and the front axle input shaft 120 at the speed of the vehicle, through the PIAD 106

A command is sent by the controller 124 ceasing manipulation of the power source 108, the transmission 113, or both the power source 108 and the transmission 113, restoring driving engagement In the engage/disengage mode used with the axle disconnect device 122, the following steps need to be performed to implement the shift strategy:

The actuators 128, 132, 140 are placed in a fully pressurized or depressurized state before the torque break is implemented The axle disconnect device 122 is not moved to release a portion of the rear axle 112 until the torque break occurs The power source 108, the transmission 113, or both the power source 108 and the transmission 113 are manipulated to cause a torque reversal in the vehicle driveline 100

The axle disconnect device 122 is moved to release a portion of the rear axle 112, causing the rear axle 112 to be drivingly disengaged from the PIAD 106

The second differential gear box 117 remains drivingly engaged with the PIAD 106 through the rear axle output shaft 154 and the PIAD 106

A command is sent by the controller 124 ceasing manipulation of the power source 108, the transmission 113, or both the power source 108 and the transmission 113, restoring driving engagement The controller 124 may adjust the manipulation of the power source 108, the transmission 113, or both the power source 108 and the transmission 113 to avoid driveline harshness which may be perceived by the operator Completion of the shift is verified by the controller 124 and control of the vehicle driveline 100 is returned to the operator of the vehicle Conditions of the vehicle driveline 100 are monitored by the controller 124 to verify connections have been properly made and to facilitate future shifts An exemplary embodiment of the shift strategy from 6×2 mode of operation to the 6×4 mode of operation for the vehicle equipped with the dual range axle disconnect system 104 will now be described.

In the automatic mode, the following steps need to be performed to implement the shift strategy:

The actuators 128, 140 are placed in a fully pressurized or depressurized state before the torque break is implemented The power source 108, the transmission 113, or both the power source 108 and the transmission 113 are manipulated to cause a torque reversal in the vehicle driveline 100

The controller 124 commands the PIAD 106 to unlock

The PIAD 106 remains in a locked condition until the torque break torque occurs

The synchronizer 152 is engaged to bring the rear axle output shaft 154, the rear axle input shaft 121, and the second differential gear box 117 up to a rotational speed of the PIAD 106 and the front axle 110

The rear axle output shaft 154 is then engaged with the PIAD 106 in the unlocked condition and the axle disconnect device 122 is commanded to engage The controller 124, in anticipation of engaging the axle disconnect device 122, pressurizes the rear axle actuator 132

Upon determination by the controller 124 that a slip condition is low and that the rear axle output shaft 154, the rear axle input shaft 121, and the second differential gear box 117 are up to a rotational speed of the PIAD 106, the controller 124 commands the rear axle actuator 132

A command is sent by the controller 124 ceasing manipulation of the power source 108, the transmission 113, or both the power source 108 and the transmission 113, restoring driving engagement In the engage/disengage mode used with the axle disconnect device 122, the following steps need to be performed to implement the shift strategy:

The power source 108, the transmission 113, or both the power source 108 and the transmission 113 are manipulated to cause a torque reversal in the vehicle driveline 100

The power source 108, the transmission 113, or both the power source 108 and the transmission 113 are further manipulated to synchronize the axle disconnect device 122

Once speeds are synchronous (within a certain tolerance) the axle disconnect device 122 may be engaged The controller 124, in anticipation of engaging the axle disconnect device 122, pressurizes the rear axle actuator 132

The controller 124 commands the rear axle actuator 132 and the axle disconnect device 122 is engaged A command is sent by the controller 124 ceasing manipulation of the power source 108, the transmission 113, or both the power source 108 and the transmission 113, restoring driving engagement In both the automatic mode and the engage/disengage mode used with the axle disconnect device 122, the following steps are also performed to implement the shift strategy:

The controller 124 may adjust the manipulation of the power source 108, the transmission 113, or both the power source 108 and the transmission 113 to avoid driveline harshness which may be perceived by the operator Completion of the shift is verified by the controller 124 and control of the vehicle driveline 100 is returned to the operator of the vehicle Conditions of the vehicle driveline 100 are monitored by the controller 124 to verify connections have been properly made and to facilitate future shifts To accomplish the shift strategies for the on demand axle engagement/disengagement system, the automatic mode, and the engage/disengage mode used with the axle disconnect device 122, a dual mode hierarchical shift controller 200 (schematically illustrated in FIG. 3) with digital compensation and command pre-shaping is employed. The dual mode hierarchical shift controller 200, which at least forms a portion of the controller 124, provides the following:

An initializing/executing strategy, which determines conditions for initializing and executing a shift by the controller 124

Figure 3:
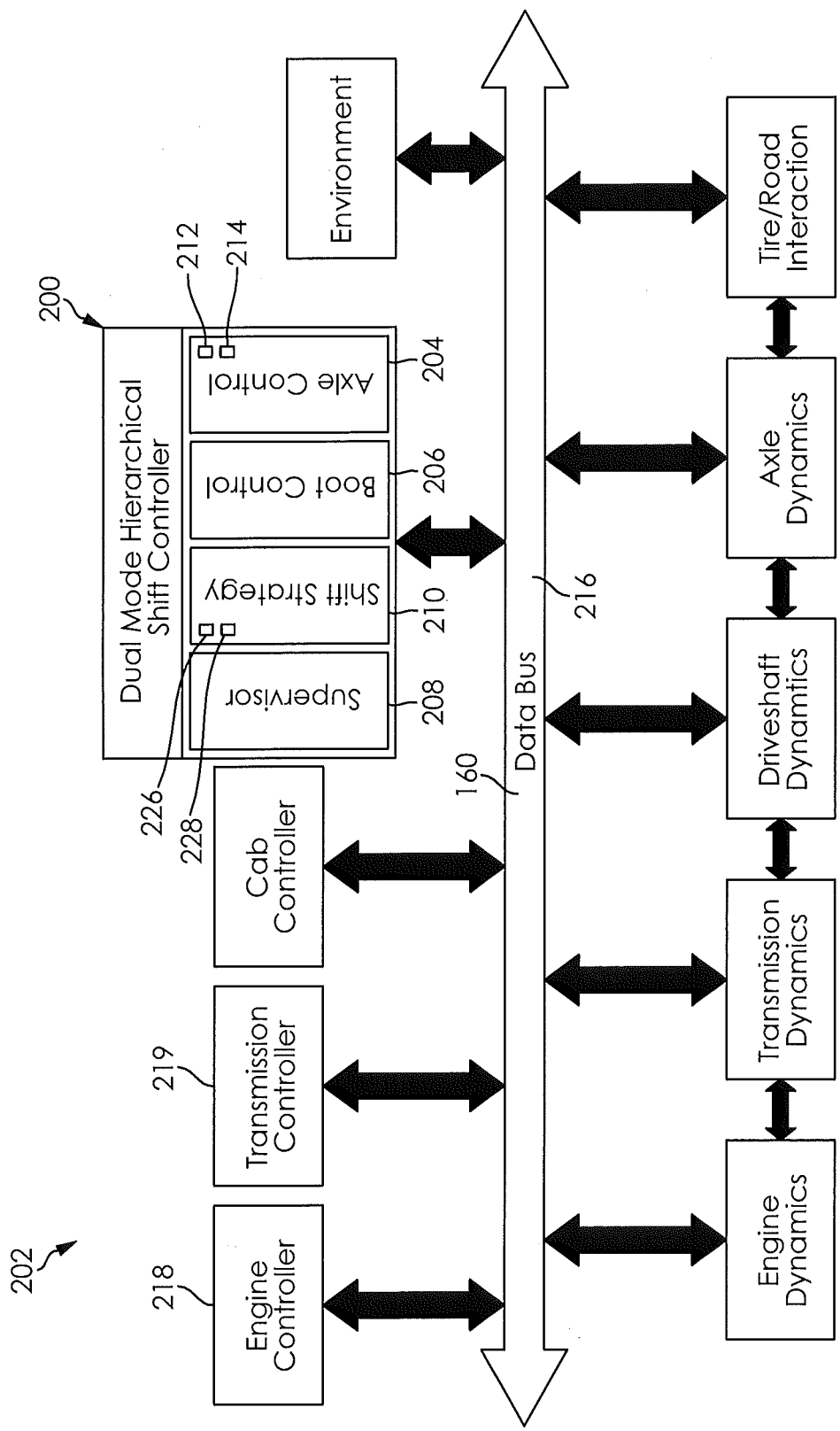
FIG. 3 is a schematic illustration of a vehicle control system architecture including a dual mode hierarchical shift controller for use with the vehicle driveline illustrated in FIG. 1.
Figure 4:
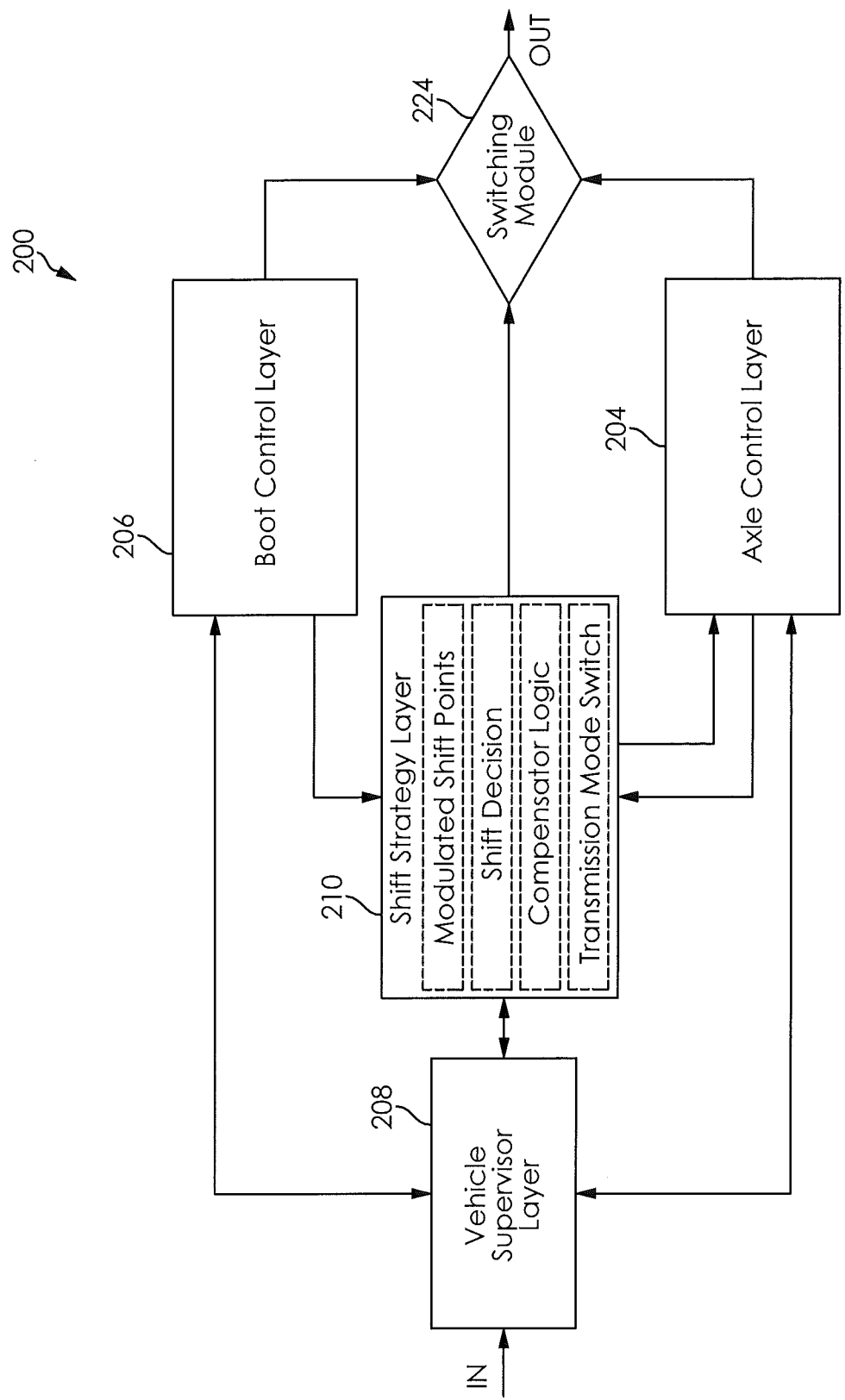
FIG. 4 is a schematic illustration of the dual mode hierarchical shift controller illustrated in FIG. 3, the dual mode hierarchical shift controller comprising an axle control layer, a boot control layer, a vehicle supervisor layer, and a shift strategy layer.

A power source override capability which employs a speed control mode, a torque control mode, and a speed/torque limit control mode A transmission inhibit capability, which is used when the transmission 113 is an automatic transmission FIG. 3 schematically illustrates a vehicle control system architecture 202 including the dual mode hierarchical shift controller 200. FIG. 4 schematically illustrates the dual mode hierarchical shift controller 200. The dual mode hierarchical shift controller 200 comprises an axle control layer 204, a boot control layer 206, a vehicle supervisor layer 208, and a shift strategy layer 210.

Figure 6A:
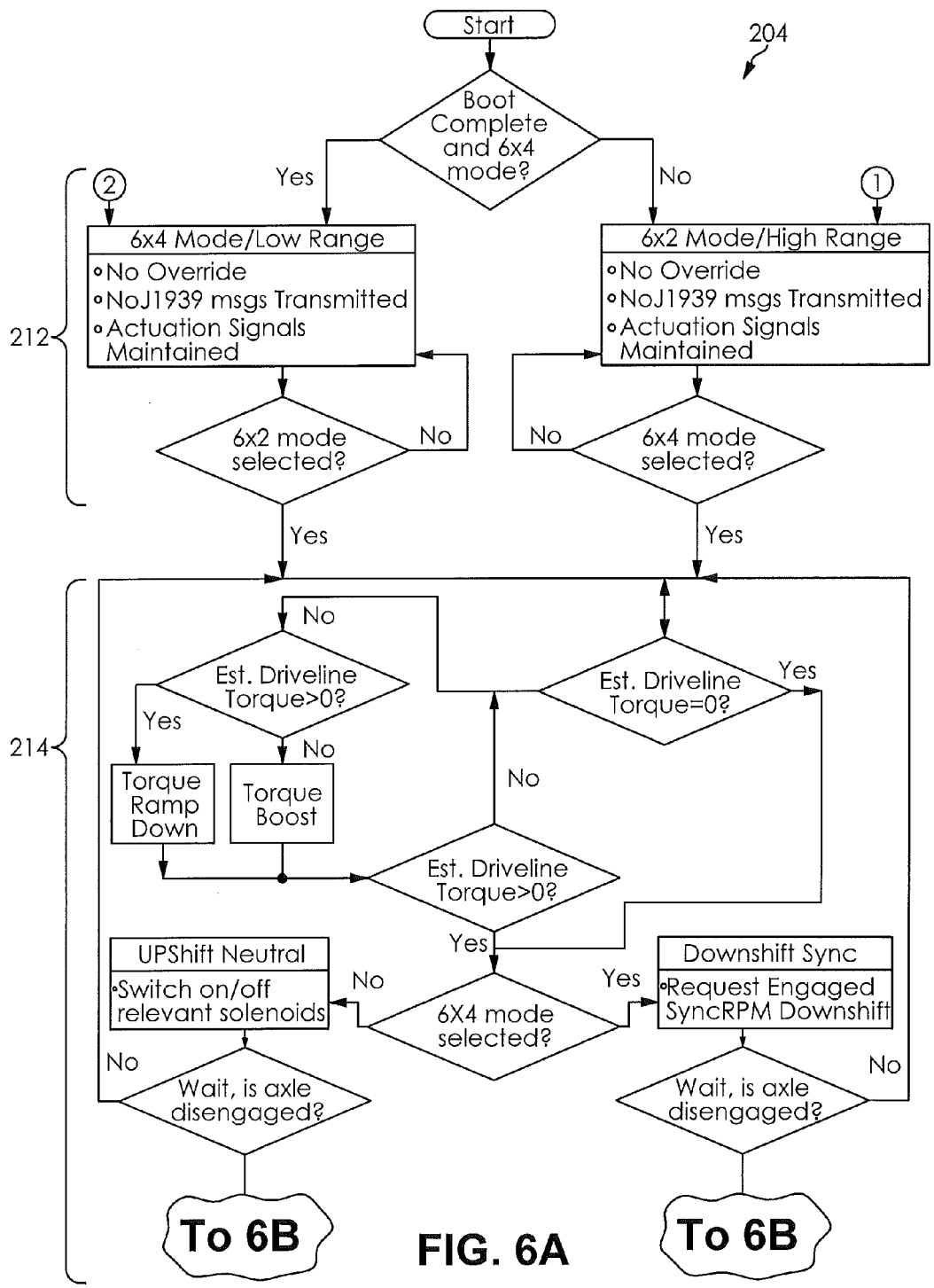
FIG. 6A is a partial schematic illustration of the axle control layer illustrated in FIG. 4.
Figure 6B:
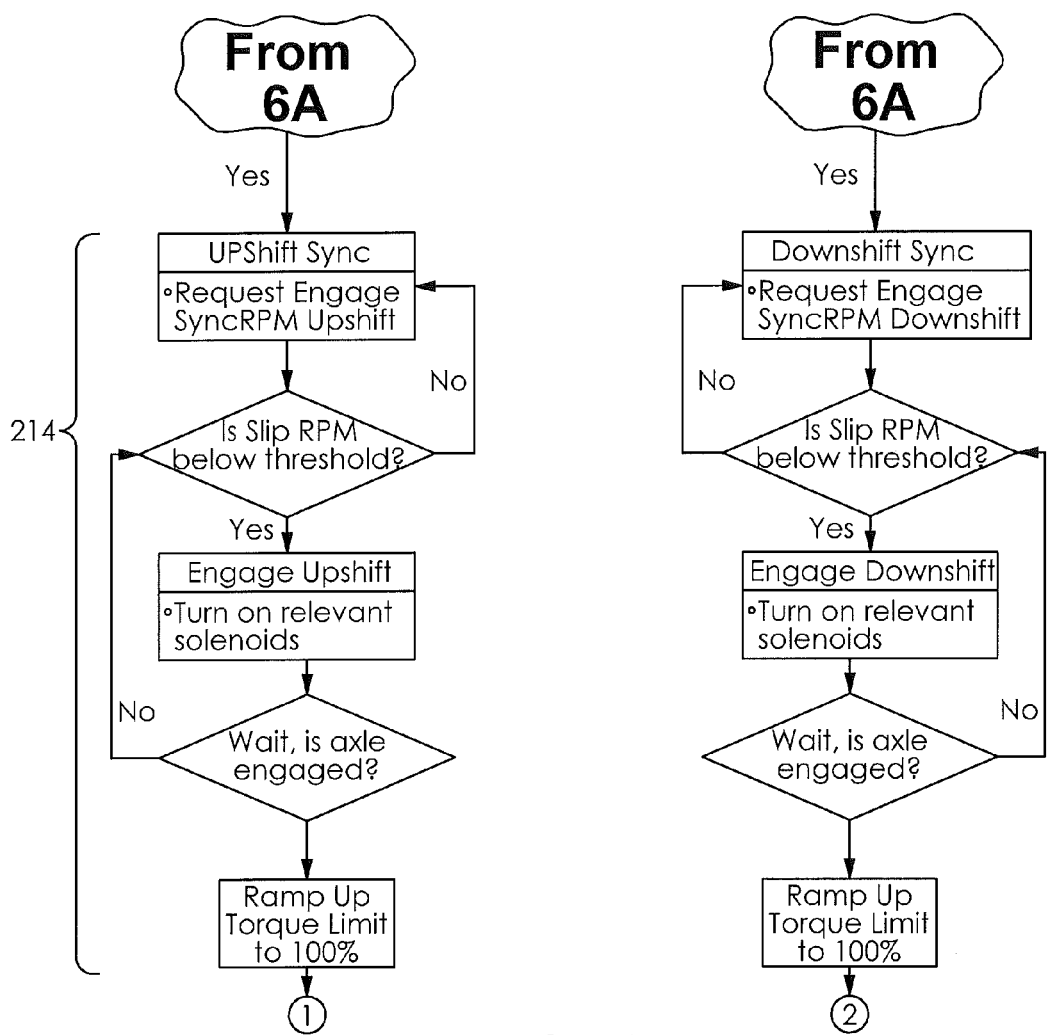
FIG. 6B is a partial schematic illustration of the axle control layer illustrated in FIG. 4.

FIGS. 6A and 6B schematically illustrates the axle control layer 204. The axle control layer 204 executes all of the steps necessary to perform a shift of the dual range axle disconnect system 104. The boot control layer 206 ensures a stable high/low range operation of the vehicle upon startup of the controller 124. The vehicle supervisor layer 208 monitors a health of the controller 200, performs fault detection, and executes remedial actions. The shift strategy layer 210 performs the tasks of modulated shift point determination, switching transmission modes, making shift decisions, and performing compensator logic.

The axle control layer 204 consists of a finite state machine 212 and a digital compensation logic 214 that sequentially executes steps necessary for achieving the axle upshift or the axle downshift as commanded by the shift strategy layer 210. The finite state machine 212 broadcasts a control signal that indicates a current operating mode for the dual range axle disconnect system 104 (the 6×4 mode of operation or the 6×2 mode of operation) or if the controller 124 is being booted up. As a non-limiting example, in this application, the axle upshift occurs in a ninth gear where the gear ratio is 1:1 (direct gear); however, it is understood that a choice of the gear ratio depends on a specific application and a hardware configuration present.

During the axle upshift, the axle control layer 204 performs the following tasks.

1. Upon receiving a shift request, the axle control layer 204 broadcasts at least one power source control message over a vehicle controller network 216
2. A driveline torque is estimated by reading a friction torque and an actual percent torque of the power source 108. A controller 218 of the power source 108 is overridden so that the axle control layer 204 is able to control an output torque and speed of the power source 108.
   a. If the torque is a positive value, the amount of torque is smoothly ramped down to about zero, using torque control.
   b. If the torque is a negative value, the amount of torque is increased to a small positive value, using torque control.
   c. If the torque is about equal to zero, the axle control layer 204 proceeds to one of the next (3 or 4) steps
3. For the automatic mode, the axle control layer 204:
   a. Activates the solenoid valves 135, 136, 137 and waits for the master actuator 128 to reach an intermediate position and for the axle disconnect device 122 to disengage. Once a neutral state is reached, the axle control layer 204 deactivates the solenoid valves 137, 138
   b. Send power source control messages for upshift synchronization, for example, to slow down a speed of the power source 108 so that a difference between a sun gear 156 and a carrier gear 158 of the PIAD 106 is about equal to zero.
   c. Deactivate solenoid valve 135 and activate the solenoid valve 136 causing actuators 128, 140 to move. The axle control layer 204 then waits until the master actuator 128 reaches a maximum position, indicating a successful engagement of the front synchronizer 150.
4. For the engage/disengage mode used with the axle disconnect device 122, the axle control layer 204:
   a. Activates the solenoid valve 137 and waits for the axle disconnect device 122 to disengage.
   b. Observes a signal from the switch 130 indicating successful disengagement of the axle disconnect device 122 and completion of the shift.
5. Next, the axle control layer 204 ramps a torque limit back to 100%, meaning to smoothly return control to the operator to complete the shift. The power source 108 is overridden using the power source control messages to smoothly restore drive back to a torque demand of the vehicle driveline 100.
6. Resume normal operation in the 6×2 mode of operation. The axle control layer 204 then indicates that the upshift has been completed, turns off all solenoid valves 134, 135, 136, 137, 138, inhibits broadcasting control messages, and waits for the next shift request During the axle downshift, the axle control layer 204 performs the following tasks.

Figure 7A:
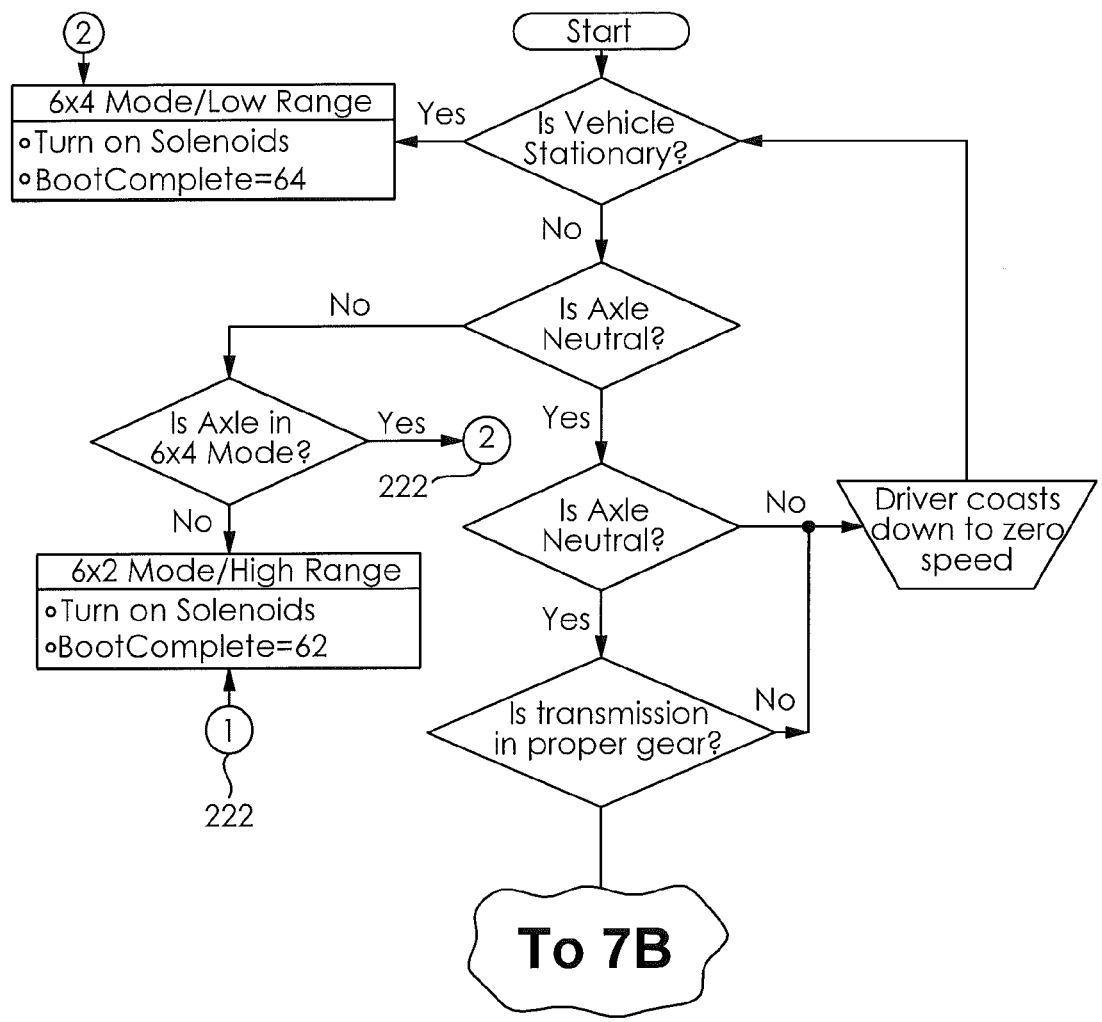
FIG. 7A is a partial schematic illustration of the boot control layer illustrated in FIG. 4.
Figure 7B:
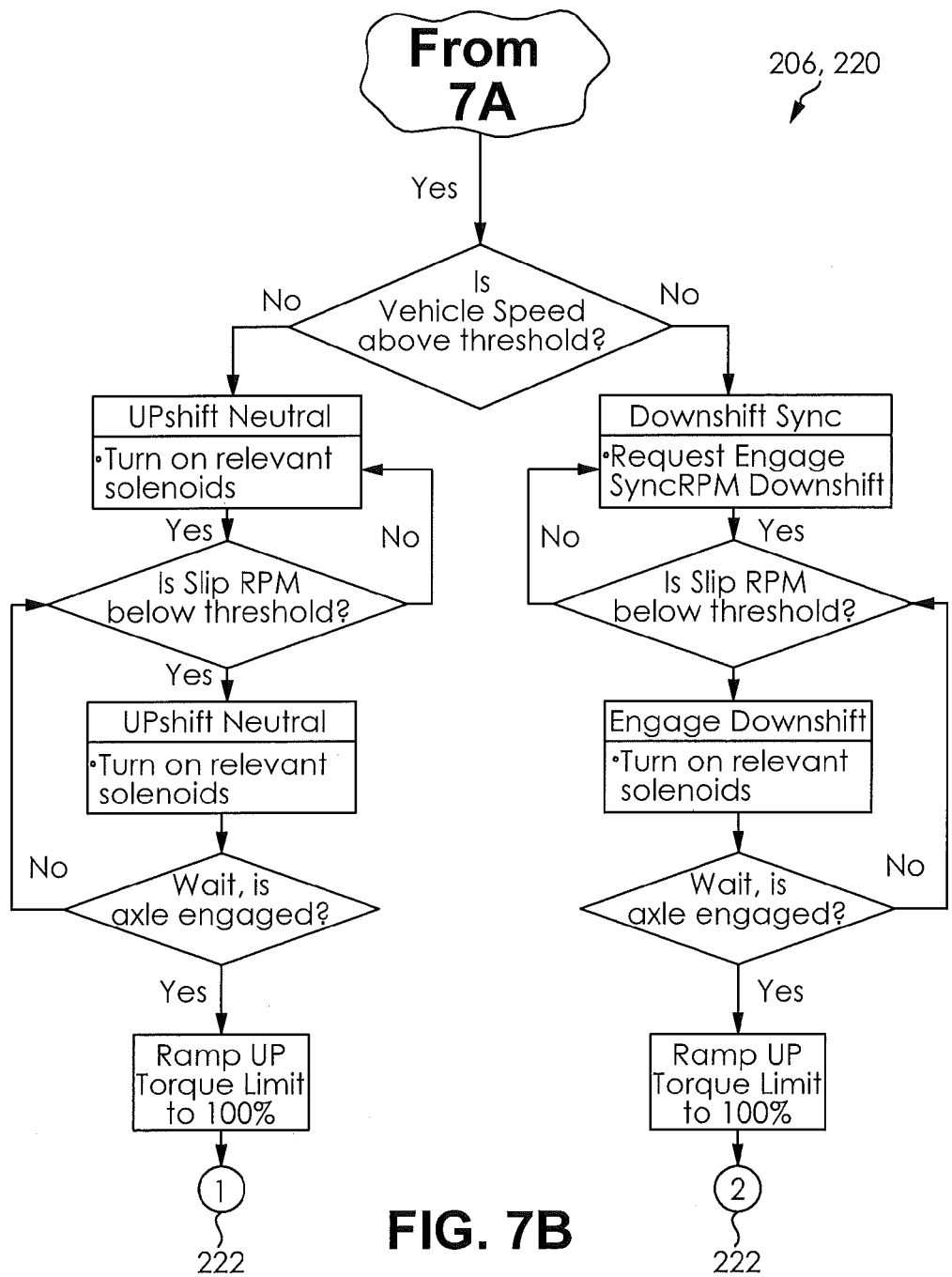
FIG. 7B is a partial schematic illustration of the boot control layer illustrated in FIG. 4.

1. Upon receiving of a shift request, the axle control layer 204 broadcasts at least one power source control message over the vehicle controller network 216
2. A driveline torque is estimated by reading a friction torque and an actual percent torque of the power source 108. The controller 218 of the power source 108 is overridden so that the axle control layer 204 is able to control an output torque and speed of the power source 108.
   a. If the torque is a positive value, the amount of torque is smoothly ramped down to about zero, using torque control.
   b. If the torque is a negative value, the amount of torque is increased to a small positive value, using torque control.
   c. If the torque is about equal to zero, the axle control layer 204 proceeds to one of the next (3 or 4) steps
3. For the automatic mode, the axle control layer 204:
   a. Activates the solenoid valves 134, 136 and waits for the master actuator 128 to reach an intermediate position, the axle control layer 204 turns off solenoid 136.
   b. Once a neutral state is reached, the axle control layer 204 sends power source control messages for downshift synchronization, for example, to slow down a speed of the power source 108 so that a difference between the sun gear 156 and the carrier gear 158 of the PIAD 106 is about equal to zero.
   c. Deactivate solenoid valve 134 and activate the solenoid valve 135 causing the master actuator 128 to move to a zero position.
   d. Deactivate the solenoid 135, then activate the solenoid 138 to move the rear axle actuator 132 to a home position, causing engagement of the axle disconnect device 122. Engagement of the axle disconnect device 122 requires speed synchronization.
4. For the engage/disengage mode used with the axle disconnect device 122, the axle control layer 204:
   a. Sends power source control messages for synchronizing the axle disconnect device 122, for example, by increasing a speed of the power source 108 so that a speed difference across the axle disconnect device 122 is about equal to zero
   b. Once the speed difference is about synchronous (within an acceptable tolerance), the axle control layer 204 activates the solenoid valve 138 and move the rear axle actuator 132 to the engaged position.
5. Next, the axle control layer 204 ramps a torque limit back to 100%, meaning to smoothly return control to the operator to complete the shift.
6. Resume normal operation in the 6×4 mode of operation. The axle control layer 204 then indicates that the downshift has been completed, turns off all solenoid valves 134, 135, 136, 137, 138, inhibits broadcasting control messages, and waits for the next shift request FIGS. 7A and 7B schematically illustrates the boot control layer 206. The boot control layer 206 includes a boot control module 220 to execute a pre-determined series of steps during a startup of the controller 124 and to handle any exceptions that may occur during the startup of the controller 124. Additionally, the boot control module 220 handles any exceptions (such as failures) that may occur during the operation of the vehicle the vehicle driveline 100 is incorporated in. The boot control module 220 handles a startup sequence for the dual range axle disconnect system 104 and also performs a recovery procedure in the event of an unexpected power loss or a reboot of the controller 124.

When the vehicle the vehicle driveline 100 is incorporated in is placed in a shut down condition, the tandem axle assembly 102 returns to a mechanical neutral state as a result of all of the solenoid valves 134, 135, 136, 137, 138 being deactivated, consequently resulting in depressurization of all of the actuators 128, 132, 140. The mechanical neutral state is considered a normal startup state for the vehicle including the dual range axle disconnect system 104. The boot control module 220 takes control of the tandem axle assembly 102 upon startup of the vehicle and once the tandem axle assembly 102 is in one of the two stable operating configurations (the 6×4 mode of operation or the 6×2 mode of operation), the boot control module 220 passes control to the axle control layer 204 which services any further requests. Prior to passing control to the axle control layer 204, the boot control module 220 has direct control of the tandem axle assembly 102.

An output control variable 222 of the boot control layer 206 indicates if a boot up of the dual range axle disconnect system 104 is in progress or the operating state of the dual range axle disconnect system 104 in which the boot up is completed (the 6×4 mode of operation or the 6×2 mode of operation). The output control variable 222 controls a switching module 224 (shown in FIG. 4) that mediates control of the dual range axle disconnect system 104 between the boot control layer 206 and the axle control layer 204. In the following examples, setting the vehicle to the 6×2 mode of operation or the 6×4 mode of operation includes controlling the power source 108, sending appropriate actuation signals, and confirming actuation in response to the signals. It should be noted that "setting the vehicle" to either the 6×4 mode of operation or the 6×2 mode of operation means executing all of the steps detailed in the operation of the axle control layer 204 to perform the shift.

1. If the vehicle is in a stationary position, the boot control layer 206 sets the vehicle to the 6×4 mode of operation. The vehicle in the stationary position is always started in the 6×4 mode of operation, as increased traction and/or a reduction in drive ratio is preferred for accelerating the vehicle from the stationary position.
2. If the controller 124 reboots with the dual range axle disconnect system 104 in the 6×4 mode of operation, the relevant solenoid valves 134, 135, 138 are activated and operation continues in a normal manner
3. If the controller 124 reboots with the dual range axle disconnect system 104 in the 6×2 mode of operation, the relevant solenoids 134, 135, 138 are activated and operation continues in a normal manner
4. If the controller 124 reboots with the dual range axle disconnect system 104 in a neutral position and the transmission 113 in the automatic mode, unexpected behavior may occur. As the rear axle output shaft 154, the rear axle input shaft 121, and the second differential gear box 117 slow down in speed, the transmission 113 may initiate a shift, causing the transmission output shaft 114 to be disconnected at both ends. If such a scenario occurs, the boot control layer 206 signals the operator of the vehicle to stop the vehicle, and the boot control layer 206 sets the dual range axle disconnect system 104 to the 6×4 mode of operation.
5. If the controller 124 reboots while the dual range axle disconnect system 104 is in the neutral position and the transmission 113 is in a manual mode and is also in a desired gear ratio to perform a shift of the dual range axle disconnect system 104:
   a. If a speed of the vehicle is greater than the cruising speed, the boot control layer 206 sets the dual range axle disconnect system 104 to the 6×2 mode of operation
   b. If a speed of the vehicle is less than the cruising speed, the boot control layer 206 sets the dual range axle disconnect system 104 to the 6×4 mode of operation The vehicle supervisor layer 208 performs three functions in the dual range axle disconnect system 104. The vehicle supervisor layer 208 performs the following tasks:

a) Monitoring of the operation of the dual range disconnect system 104 to ensure a proper functioning of the dual range axle disconnect system 104 b) Gathers of a diagnostic information to provide an error code or error codes and a usage report or usage reports to the operator of the vehicle the vehicle driveline 100 is incorporated in c) Executes a recovery action if needed The vehicle supervisor layer 208 continuously monitors the operations of the dual range axle disconnect system 104 using information from the sensors 142, 143, 144, 145 to evaluate parameters critical to the tandem axle assembly 102. Some of the parameters the vehicle supervisor layer 208 monitors are:

1. An axle torque estimation to predict slow evolving faults, such as wear of the synchronizers 150, 152 and the axle disconnect device 122
2. Scanning the dual range axle disconnect system 104 for unforeseen events, such as an anti-lock braking system event
3. Perform continuous monitoring of the operating conditions of the components of the tandem axle assembly 102. Non limiting examples of conditions which are continuously monitored are a temperature of the synchronizers 150, 152 or the axle disconnect device 122 to prevent overheating and/or damage thereto
4. A health of the actuators 128, 132, 140 through information obtained from the sensors 142, 143, 144, 145 and signal processing algorithms. Monitoring the health of the actuators 128, 132, 140 prevents any successive failure condition The vehicle supervisor layer 208 is also responsible for the following diagnostic functions:

1. Ensuring a validity and an accuracy of information collected by the sensors 142, 143, 144, 145 through the use of calibration routines
2. Determine a proper functioning of components of the tandem axle assembly 102 through periodic engagement-disengagement routines, which are performed while the vehicle the vehicle driveline 100 is incorporated in is in the stationary position
3. Transfer of the diagnostic information to a vehicle control module (not shown) for display on a dashboard user interface of the vehicle the vehicle driveline 100 is incorporated in When the recovery action needs to be performed, the vehicle supervisor layer 208 may perform at least one of the following actions:

1. Activate a rear axle engagement/disengagement "limp" mode in the event that an irrecoverable failure is detected on any of the components of the front axle 110
2. Determine whether to one of revert, hold, and stop an ongoing shift of the dual range axle disconnect system 104 in the case of a detection of a fault
3. Employ redundancies to prevent a loss of information through a failure of at least one of the sensors 142, 143, 144, 145

Figure 5:
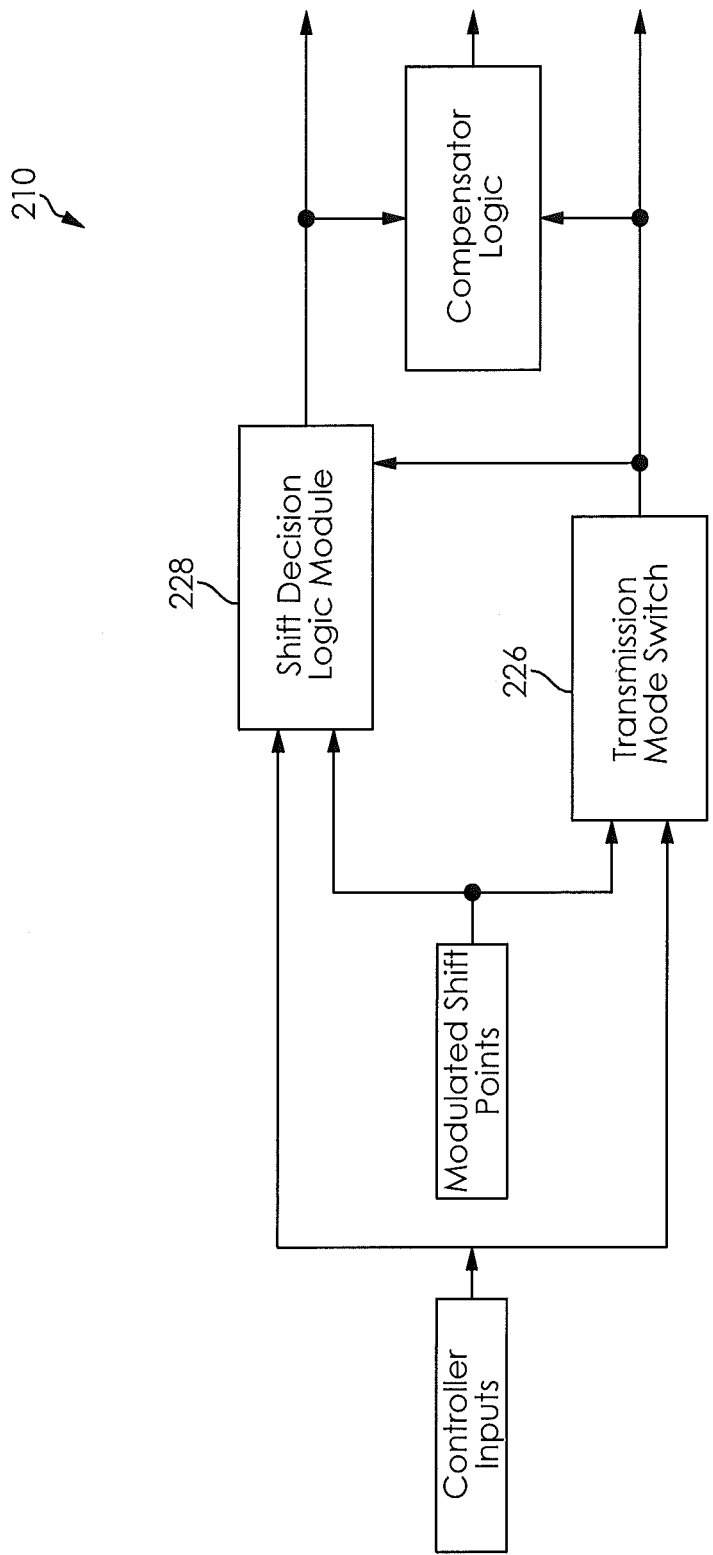
FIG. 5 is a schematic illustration of the vehicle supervisor layer illustrated in FIG. 4.

FIG. 5 schematically illustrates the shift strategy layer 210. The shift strategy layer 210 performs the task of determining a modulated shift point for the dual range axle disconnect system 104. A proper determination of a shift point is essential for optimized fuel economy, improved behavior of the vehicle, and for a comfort of the operator of the vehicle the vehicle driveline 100 is incorporated in. The modulated shift-point is determined using a position of an accelerator pedal (not shown) and information from a brake switch (not shown) from an SAE J1939 data link 160; however, it is understood that the vehicle control system architecture 202 may include other types of data links. In response to such information, a shift point decision logic is modulated. However, it is understood that other inputs, such as a percent driver demand information, which may be obtained from the SAE J1939 data link 160 could be incorporated into determining the modulated shift point.

The following procedures describe determining the modulated shift point for an upshift point and a downshift point.

Figure 8:
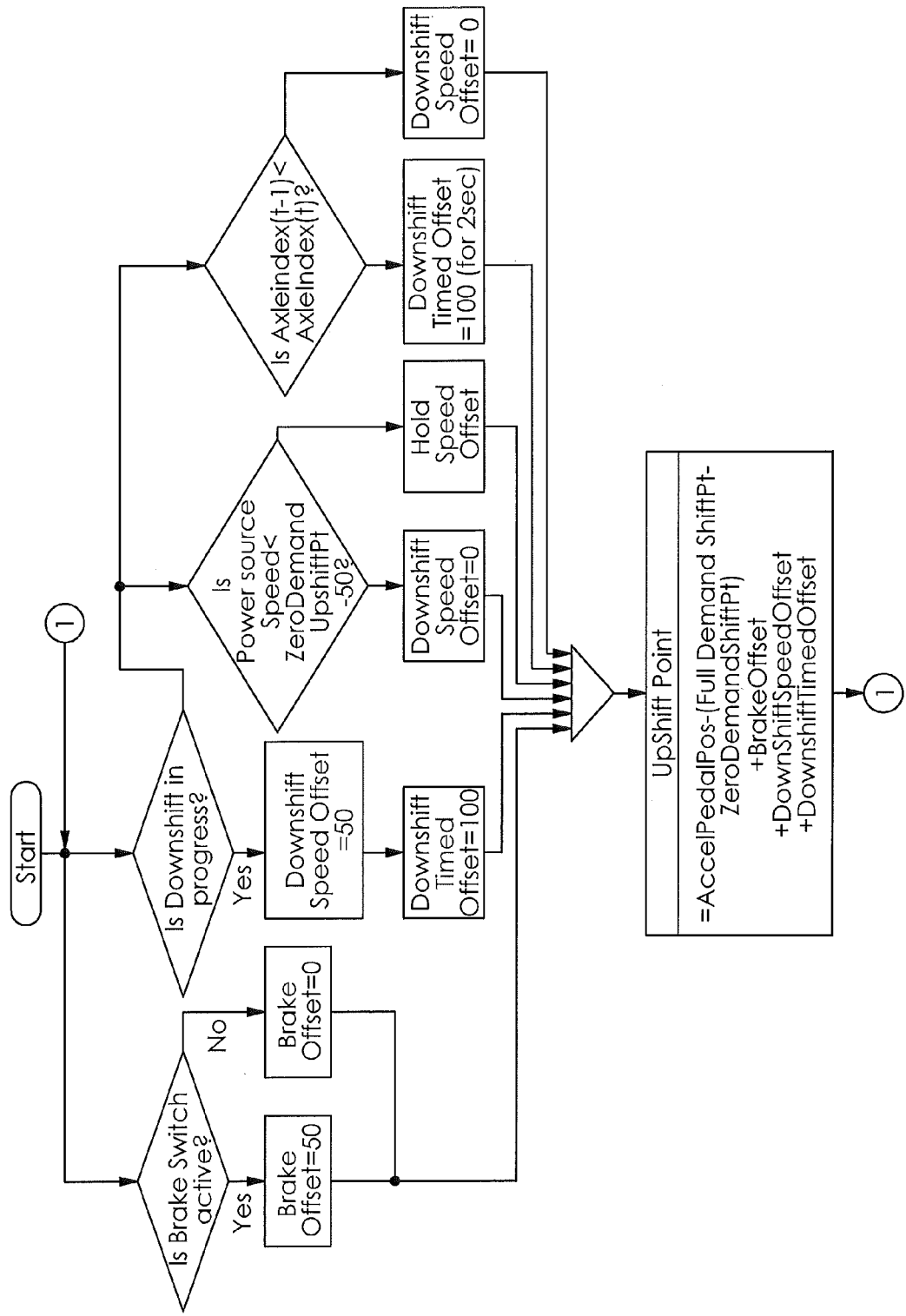
FIG. 8 is a schematic illustration of an upshift algorithm forming a portion of the shift strategy layer illustrated in FIG. 4.

The procedure for determining the modulated shift point for the upshift point, which forms a portion of the shift strategy layer 210, is schematically illustrated in FIG. 8

1. The upshift point=(a zero demand upshift point+the position of the accelerator pedal*(a full demand upshift point−the zero demand upshift point)+a brake offset+a downshift speed offset+a downshift timed offset)

Figure 9:
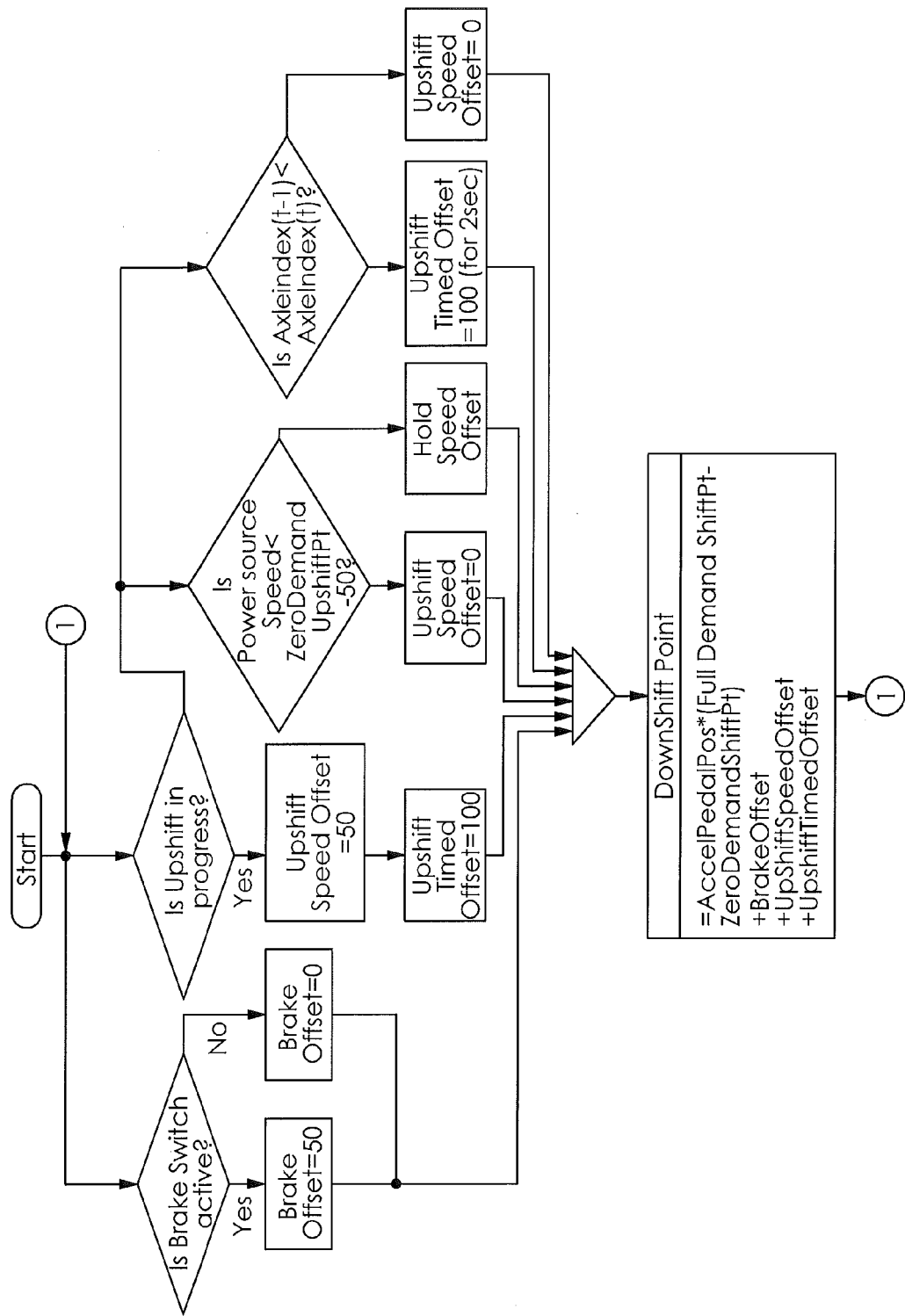
FIG. 9 is a schematic illustration of a downshift algorithm forming a portion of the shift strategy layer illustrated in FIG. 4.

If the downshift is in progress, then the downshift speed offset is set to equal ($\delta$) rpm, which is a value added to the shift point to avoid hunting during the downshift If a rotational speed of the power source 108 is less than the zero demand upshift point minus ($\phi$), then reset the downshift speed offset to be equal to zero If a downshift is in progress, then the downshift timed offset is set to equal ($\phi$) rpm, which is a value added to the shift point to avoid hunting during the downshift If a downshift has just been completed (for example, the mode of the dual range axle disconnect system 104 in the current timestep is in the 6×2 mode of operation and the mode in the previous timestep was in the 6×4 mode of operation) then the downshift timed offset is set to equal ($\phi$) rpm for about 2 seconds, which is a value added to the shift point to avoid hunting during the downshift If the brake switch is equal to one, indicating that a brake pedal of the vehicle is depressed by the operator of the vehicle, then the brake offset is set to equal ($\delta$) rpm, which is a value added to the shift point to avoid hunting during the downshift The procedure for determining the modulated shift point for the downshift point, which forms a portion of the shift strategy layer 210, is schematically illustrated in FIG. 9

2. The downshift point=(a zero demand downshift point+ the position of the accelerator pedal*(a full demand downshift point−the zero demand downshift point)+the brake offset−an upshift speed offset−an upshift timed offset)

If the upshift is in progress, then the upshift speed offset is set to equal ($\delta$) rpm, which is a value added to the shift point to avoid hunting during the upshift If the rotational speed of the power source 108 is greater than the zero demand downshift point plus ($\phi$), then reset the upshift speed offset to be equal to zero If an upshift is in progress, then the upshift timed offset is set to equal ($\phi$) rpm, which is a value added to the shift point to avoid hunting during the upshift If an upshift has just been completed (for example, the mode of the dual range axle disconnect system 104 in the current timestep is in the 6×4 mode of operation and the mode in the previous timestep was in the 6×2 mode of operation) then the upshift timed offset is set to equal ($\phi$) rpm for about 2 seconds, which is a value added to the shift point to avoid hunting during the upshift If the brake switch is equal to one, indicating that a brake pedal of the vehicle is depressed by the operator of the vehicle, then the brake offset is set to equal (δ) rpm, which is a value added to the shift point to avoid hunting during the upshift The modulated shift point determination determines the point at which, other conditions permitting, an axle upshift or the axle downshift can be performed. A transmission mode switch 226 sets the transmission 113 to the manual mode before initiating an upshift and back to an automatic mode after a downshift (relevant to automatic transmissions). The shift decision monitors operating conditions and commands the axle control layer 204 when the shift must be performed.

The transmission mode switch 226 of the shift strategy layer 210 sets the transmission 113 to the manual mode before initiating the upshift and back to the automatic mode after the downshift (relevant when the transmission 113 is an automatic transmission). In the automatic transmission, an electronic control unit sends out power source control messages at a predefined interval, even when a shift is not in progress. The same messages are used by the axle control layer 204 to perform the shift; the transmission 113 must be controlled to prevent it from interfering with the shift of the dual range axle disconnect system and also the 6×2 mode of operation. A relay switch may be connected to a console of the transmission 113 or connected to a digital output port of the controller 124, which enables the controller 124 to directly control the mode of the transmission 113.

The shift point decision logic sends a timed pulse to a plurality of relay switches connected to a plurality of push buttons on a console of the transmission 113 to set the transmission 113 to the manual mode. As a result, the mode of the transmission 113 is switched to the manual mode in advance of the axle upshift, stays in the manual mode throughout the 6×2 mode of operation, and is then switched back to the automatic mode after the axle downshift has occurred. In the event that the axle shift is performed at a lower gear, the transmission 113 should still be able to shift until a time when it is appropriate to perform the subsequent axle shift. In this case, the transmission 113 is placed back into the automatic mode once the axle shift is complete.

Figure 10:
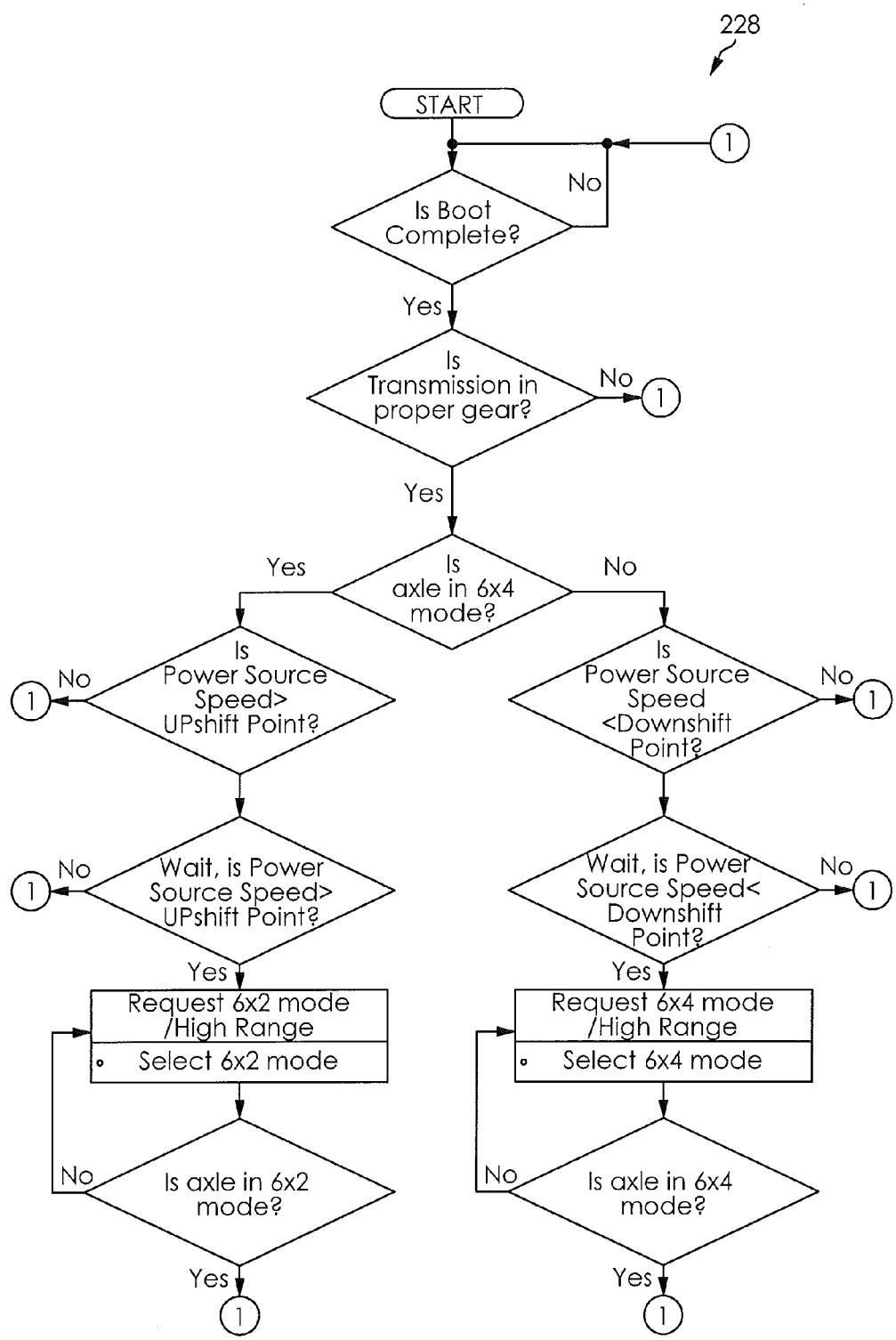
FIG. 10 is a schematic illustration of a shift decision logic forming a portion of the shift strategy illustrated in FIG. 4.

Prior to changing the operating mode of the transmission 113, conditions must be satisfied. Those conditions are:

For the manual mode:
 A selected gear of the transmission 113 must be the same as a current gear of the transmission 113, which must also be the same as a desired gear of the transmission 113; indicating that the transmission 113 is not in the middle of a gear shifting procedure
 A requested gear feedback from the transmission 113 must indicate that the transmission 113 is in the automatic mode
 The dual range axle disconnect system 104 must be in the 6×4 mode of operation if the axle shift is performed only in direct gear and a rotational speed of the power source 108 must be greater than or equal to the upshift point minus (δ) rpm, which is a value added to the shift point in advance of the rotational speed of the power source 108 crossing the shift point; for example, setting the transmission 113 to the manual mode when the axle upshift is imminent
 Alternately, the dual range axle disconnect system 104 must be in the 6×2 mode of operation at a lower transmission gear and a rotational speed of the power source 108 must be greater than or equal to the downshift point plus (δ) rpm, which is a value added to the shift point in advance of the rotational speed of the power source 108 crossing the shift point, when the axle downshift is imminent For the automatic mode:
 A selected gear of the transmission 113 must be the same as a current gear of the transmission 113, which must also be the same as a desired gear of the transmission 113; indicating that the transmission 113 is not in the middle of a gear shifting procedure
 A requested gear feedback from the transmission 113 must indicate that the transmission 113 is in the manual mode
 The dual range axle disconnect system 104 must be in the 6×4 mode of operation and a rotational speed of the power source 108 must be less than or equal to the downshift point minus (δ) rpm, which is a value added to the shift point in advance of the rotational speed of the power source 108 crossing the shift point; for example, setting the transmission 113 to the automatic mode when the axle downshift is completed
 Alternately, the dual range axle disconnect system 104 must be in the 6×2 mode of operation at a lower transmission gear and a rotational speed of the power source 108 must be less than or equal to the downshift point plus (δ) rpm, which is a value added to the shift point in advance of the rotational speed of the power source 108 crossing the shift point, when the axle upshift is completed The shift strategy layer 210 includes a shift decision logic module 228. FIG. 10 is a schematic illustration of the shift decision logic module 228 forming a portion of the shift strategy layer 210. The shift decision logic module 228 monitors a speed of the power source 108, an operating mode of the transmission 113, a mode of the dual range axle disconnect system 104 (the 6×4 mode of operation or the 6×2 mode of operation), and a current gear of the transmission 113. When certain conditions are present, the shift decision logic module 228 sends a signal to the axle control layer 204 to begin executing a shift. An output variable is then read by the axle control layer 204 and executes the actions corresponding to the request. The output variable can take on a plurality of different values based on the desired operating conditions.

The following conditions must be satisfied for the shift strategy layer 210 to initiate the axle upshift or the axle downshift:

1. For the shift strategy layer 210 to initiate the axle upshift:
 The mode of the dual range axle disconnect system 104 must be the 6×4 mode of operation
 The operating mode of the transmission 113 must be the manual operating mode
 The selected gear of the transmission 113 must be the same as the current gear of the transmission 133, which must also be the same as the desired gear of the transmission 113
 A rotational speed of the power source 108 must be greater than the upshift point, in a consistent manner for a brief verification time or the axle upshift may be initiated by the operator using the dashboard switch, for example (in the case of a manual transmission)

2. For the shift strategy layer 210 to initiate the axle downshift:
 The mode of the dual range axle disconnect system 104 must be the 6×4 mode of operation
 The operating mode of the transmission 113 must be the manual operating mode
 The selected gear of the transmission 113 must be the same as the current gear of the transmission 113, which must also be the same as the desired gear of the transmission 113

A rotational speed of the power source 108 must be less than the downshift point, in a consistent manner for a brief verification time or the axle downshift may be initiated by the operator using the dashboard switch, for example (in the case of a manual transmission)

Figure 11:
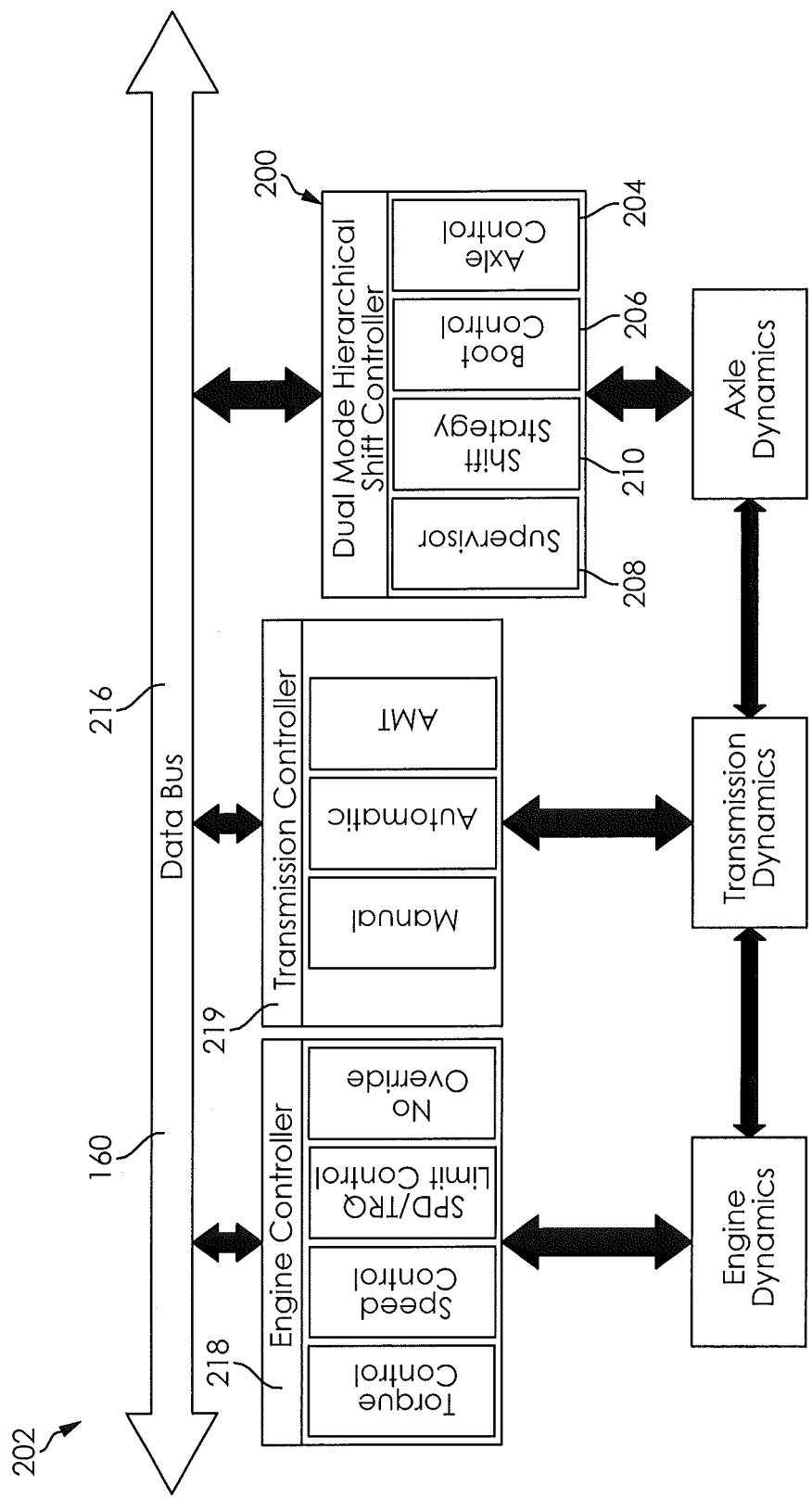
FIG. 11 is a schematic illustration of the vehicle control system architecture including the dual mode hierarchical shift controller illustrated in FIG. 3, a power source controller, and a transmission controller.

FIG. 11 is a schematic illustration of the vehicle control system architecture including the dual mode hierarchical shift controller 200, the power source controller 218, and a transmission controller 219. The power source controller 218 and the transmission controller 219 are vehicle level controllers of the vehicle the vehicle driveline 100 is incorporated in.

Additionally, the shift strategy layer 210 may further comprise a modulated shift point determination algorithm which uses a vehicle torque demand information such as the position of the accelerator or other signals from the SAE J1939 data link 160 to automatically determine the shift points for the axle upshift and the axle downshift (as described hereinabove).

Additionally, the shift strategy layer 210 may further comprise a method by which different vehicle sensor signals and parameters are combined to determine the optimal upshift and downshift performance variables and parameters.

Additionally, the shift strategy layer 210 may further comprise a method for optimization of upshift and downshift performance through control compensation (as described hereinabove) and the resulting effect on the control logic in other layers of dual mode hierarchical shift controller 200.

Additionally, the shift strategy layer 210 may further comprise a method for selection of a power source control mode and a control compensation strategy for the a dual range axle disconnect system 104 based on a desired response behavior of the power source 108 in relation to a current behavior of the power source 108; and a method for selection of a transmission override mode to switch the transmission 113 from the automatic mode to the manual mode of the axle disconnect operation before commencing an axle shift operation to prevent a shift operation of the transmission 113 during a shifting of the dual range axle disconnect system 104.

Figure 12:
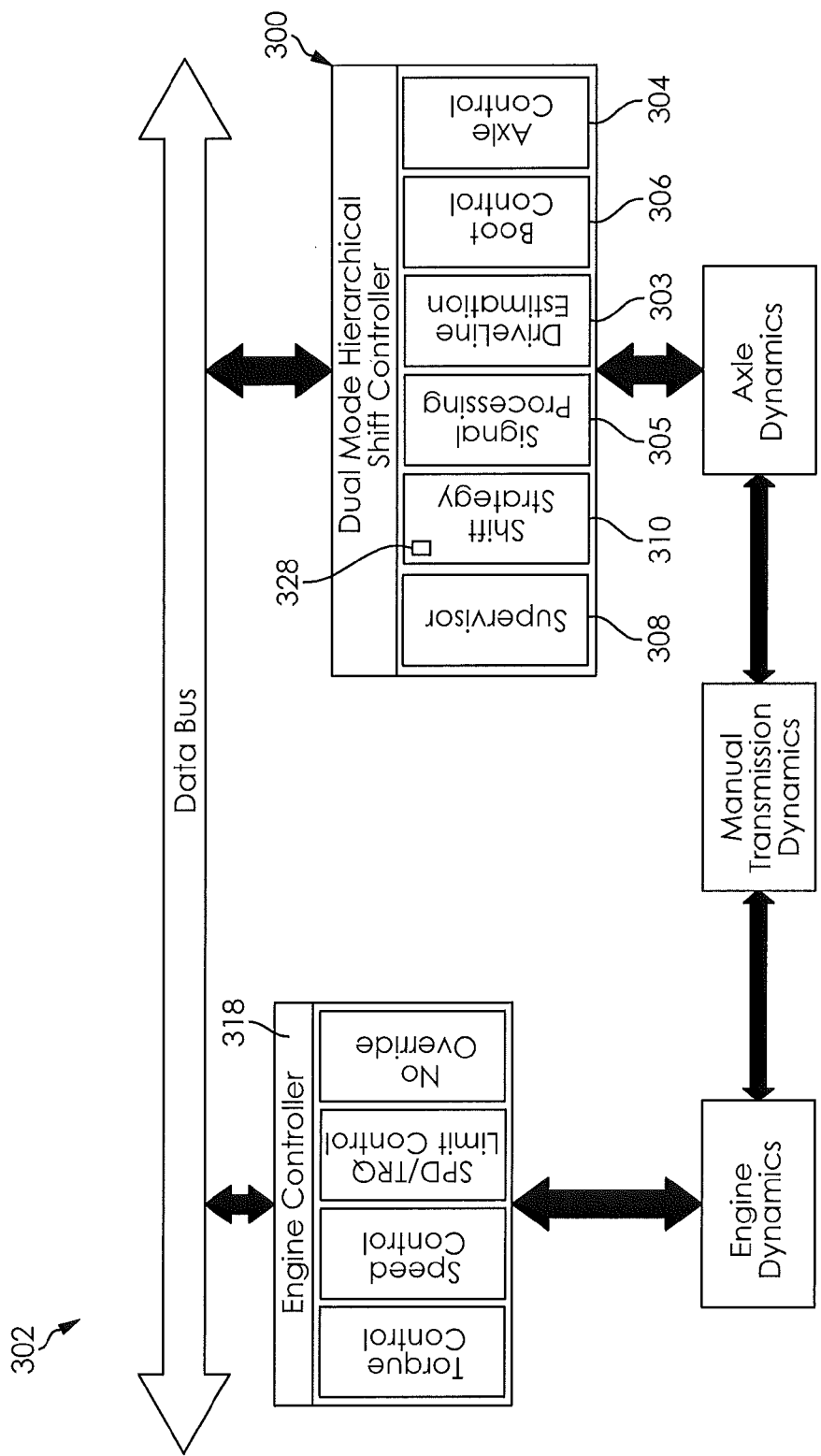
FIG. 12 is a schematic illustration of a vehicle control system architecture including a dual mode hierarchical shift controller illustrated in FIG. 3 and a power source controller according to another embodiment of the present invention, the dual mode hierarchical shift controller for use with a manual transmission.

FIG. 12 schematically illustrates a plurality of control strategies that are required when the transmission 113 is a manual transmission. FIG. 12 illustrates a dual mode hierarchical shift controller 300 forming a portion of a vehicle control system architecture 302 according to another embodiment of the invention. The embodiment shown in FIG. 12 includes similar components to the vehicle control system architecture 302 illustrated in FIG. 3. Similar features of the embodiment shown in FIG. 3 are numbered similarly in series, with the exception of the features described below.

When the dual range axle disconnect system 104 is paired with the transmission 113 that is a manual transmission, there are two possible ways by which the axle upshift or the axle downshift can be initiated:

1. The axle shift can be initiated through the use of an input operator by the operator (which may be referred to as on-demand shifting). When the axle shift is performed this way the operator of the vehicle initiates the axle shift through an operator interface of the dual range axle disconnect system 104.
2. The axle shift can be initiated automatically. When the axle shift is performed this way the conditions appropriate for the axle shift are determined by the controller 124 and the axle shift is then initiated by the controller 124.

When the dual range axle disconnect system 104 is paired with the transmission 113 that is a manual transmission, the transmission 113 does not typically include a transmission controller in communication with the vehicle controller (not shown) via the vehicle controller network 216. Information such as a current transmission gear ratio, a transmission output shaft speed, a transmission shift in progress, a current gear, and a selected gear are not available to the dual mode hierarchical shift controller 300. Such information is therefore inferred from information which is available on the vehicle controller network 216 or through a use of hardware modification. As a non-limiting example, the information may be inferred through the use of a plurality of speed sensors or other sensors.

Further, when the dual range axle disconnect system 104 is paired with the transmission 113 that is a manual transmission, a result of the transmission 113 not having the transmission controller is that the controller 124 of the dual range axle disconnect system 104 cannot inhibit the operator from performing a shift of the transmission 113 in the middle of a shift of the dual range axle disconnect system 104. Similarly, the operator cannot inhibit the controller 124 from performing the shift of the dual range axle disconnect system 104 so that the transmission 113 may be shifted. The dual range axle disconnect system 104 cannot be prevented from shifting during a shift of the transmission 113 as there is no way controller 124 of the dual range axle disconnect system 104 to detect a shift of the transmission 113 in progress.

By necessitating an input of the operator to perform the shift of the dual range axle disconnect system 104, the operator would be actively engaged in initiating the shift of the dual range axle disconnect system 104, and hence would not be attempting a shift of the transmission 113 at the same time. Similarly, by necessitating an input of the operator to perform a shift of the transmission 113, the operator would be actively engaged in initiating a shift of the transmission 113, and hence would not be attempting the shift of the dual range axle disconnect system 104 at the same time. As a result, a more sophisticated method is required for automatically initiating a shift of the dual range axle disconnect system 104.

As indicated, unlike the transmission 113 that is an automated manual transmission or the transmission 113 that is an automated transmission based on the operation of the dual range axle disconnect system 104 described in detail hereinabove, when using the manual transmission, there are fewer options for automating control of the dual range axle disconnect system 104 when performing the axle shift. Three options for automating control of the dual range axle disconnect system 104 when performing the axle shift are described below.

A first option employs existing sensor data to infer a torque in the vehicle driveline 100 through a driveline estimation layer 303 which employs an online torque estimation algorithm, that when used with the dual mode hierarchical shift controller 300 shown in FIG. 12 will allow one to determine if the vehicle driveline 100 is in an active transmission shift process or if the vehicle driveline 100 is in a neutral condition. In the neutral condition, automated dual range disconnect shifts are possible for the dual range axle disconnect system 104.

A second option employs a signal processing layer 305 which employs signal processing techniques to infer an amplitude shift and a phase shift, which tends to be different for the vehicle driveline 100 in a fully engaged condition versus the vehicle driveline 100 in a disengaged condition. Using such information, in conjunction with a frequency domain control design technique, it is possible to implement a decision logic which will allow shifting of the dual range axle disconnect system 104 to be automated.

A third option employs interpreting driveline frequency signatures (which can be directly used in an online digital signal processing algorithm) to discern the vehicle driveline 100 in the fully engaged condition from the vehicle driveline 100 in a disengaged condition. Using such information, it is possible to implement a decision logic which will allow shifting of the dual range axle disconnect system 104 to be automated.

The dual mode hierarchical shift controller 300 for axle shift decision logic may further comprise a vehicle supervisor layer 308 which provides system level monitoring and control to ensure that the vehicle control system architecture 302 provides consistent safe and reliable operation and a shift strategy layer 310 (for control of the axle upshift and the axle downshift) which interfaces an axle control layer 304 and a shift strategy layer 310 with the vehicle supervisor layer 308. The vehicle supervisory layer 308 may also be referred to as a power source management and transmission over-ride layer.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise at least one unique algorithm and decision logic (as described hereinabove) to ensure that the dual mode hierarchical shift controller 200, 300 provides consistent, safe and reliable system operation.

The at least one unique algorithms and decision logic uses various system data and parameters from each of the layers 204, 106, 208, 210, 303, 304, 305, 306, 308, 310 of the dual mode hierarchical shift controller 200, 300 to ensure performance of the vehicle control system architecture 202, 302 to specifications. The at least one unique algorithms and decision logic ensures a fail-soft operation in the event of a fault of one of the sensors 142, 143, 144, 145, the actuators 128, 132, 140, or a fault of the vehicle control system architecture 202, 302.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise the shift strategy layer 210, 310 (for control of the axle upshift and the axle downshift) which interfaces the axle control layer 204, 304 and a shift decision logic module 228, 328 with the vehicle supervisor layer 208, 308. The shift strategy layer 210, 310 further comprises a method and process to obtain information from the sensors 142, 143, 144, 145 and determine an optimal mode for the dual range axle disconnect system 104 (the 6×4 mode of operation or the 6×2 mode of operation) for current operating conditions of the vehicle the vehicle driveline 100 is incorporated in.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise may further comprise a method which uses various speed data of components of the tandem axle assembly 102 to make decisions for engagement and disengagement of the axle disconnect device 122 based on synchronizer speed errors, a method which uses positions of the actuators 128, 132, 140 to determine stable states of the vehicle such as the 6×4 mode of operation, the 6×2 mode of operation, a double neutral mode, an intermediate transition states (between the stable states), and a logic engine which combines the axle control layer 304 with a decision logic from higher layers such as a power source dynamics layer and a transmission override layer to enable various stable states of the dual range axle disconnect system 104 (such as the 6×4 mode of operation, the 6×2 mode of operation, and the double neutral mode).

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise a method to ensure startup of the dual range axle disconnect system 104 in one of the stable operating states (such as the 6×4 mode of operation or the 6×2 mode of operation), determined using positions of the actuators 128, 132, 140 and a logic engine to recognize a plurality of specific startup scenarios and execute an appropriate recovery action.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise a specific method by which the solenoid valves 134, 135, 136 are combined with the actuators 128, 140 to transition the dual range axle disconnect system 104 between three stable states (the 6×4 mode of operation, the 6×2 mode of operation, and the double neutral mode), nine transient states, and a combination of the method described hereinabove for control of the front axle 110 with engagement and disengagement of the rear axle 112 based on a speed sensing of at least one of the axles 110, 112 using one of the sensors 144, 145, and a calculation of various effective drive ratios and therefore synchronizer up-stream and down-stream speed values. The synchronizer up-stream and down-stream speed values are compared with a power source broadcast speed using an effective drive ratio and the use of an analytical computation to determine at least one axle control strategy.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise may further comprise a method and apparatus for an on-demand shift from the 6×4 mode of operation to the 6×2 mode of operation and from the 6×2 mode of operation to the 6×4 mode of operation using the dual mode hierarchical shift controller 200, 300. The method further comprises the step of using the vehicle supervisor layer 208, 308 for a monitoring function, a control and a safety function, the vehicle supervisor layer 208, 308 using at least one algorithm and a decision logic to provide a consistent, safe and reliable operation of the dual range axle disconnect system 104.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise using various vehicle system data from the sensors 142, 143, 144, 145 and parameters from the layers 204, 206, 208, 210, 303, 304, 305, 306, 308, 310 of the dual mode hierarchical shift controller 200, 300 to ensure system performance to specifications and ensure a fail safe operation in the event of a fault of one of the sensors 142, 143, 144, 145, the actuators 128, 132, 140, or a fault of the vehicle control system architecture 202, 302.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise a method and apparatus for on-demand shift from the 6×4 mode of operation to the 6×2 mode of operation and from the 6×2 mode of operation to the 6×4 mode of operation using the in the dual mode hierarchical shift controller 200, 300, the method further comprising the step of using the shift strategy layer 208, 308 (which comprises at least one algorithm and decision logic) for reading or monitoring various vehicle sensor data and parameters to determine the feasibility of executing the axle shift by the operator, selection a control mode of the power source 108, and implementing a dual range disconnect control compensation strategy based on a desired power source response behavior in relation to current power source behavior. The method further comprises selection of the transmission mode switch 226 to switch the transmission 113 from the automatic mode to the manual mode before commencing an axle shift to prevent a shift of the transmission 113 during the process of executing an axle shift.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise a method and apparatus for on-demand shift from the 6×4 mode of operation to the 6×2 mode of operation and from the 6×2 mode of operation to the 6×4 mode of operation using the dual mode hierarchical shift controller 200, 300, the method further comprising the step of using various speed data of components of the tandem axle assembly 102 to make decisions for an engagement and a disengagement of the axle disconnect device 122 based on speed errors of the synchronizers 150, 152.

A method for fully automatic and/or on-demand shifts from the 6×4 mode of operation to the 6×2 mode of operation and from the 6×2 mode of operation to the 6×4 mode of operation in the dual mode hierarchical shift controller 200, 300 having the vehicle supervisor layer 208, 308 may further comprise a method and apparatus for on-demand shift from the 6×4 mode of operation to the 6×2 mode of operation and from the 6×2 mode of operation to the 6×4 mode of operation using the dual mode hierarchical shift controller 200, 300, the method further comprising the step of using positions of the actuators 128, 132, 140 to determine a stable state of the dual range axle disconnect system 104, such as the 6×4 mode of operation, the 6×2 mode of operation, the double neutral mode, and the intermediate transition states (between the stable states).

The method for fully automatic and/or on-demand 6×4 to 6×2 shifts and 6×2 to 6×4 shift in a tandem axle assembly having the vehicle supervisor layer 208, 308 may further comprise a method and apparatus for on-demand shift from the 6×4 mode to the 6×2 mode shift (upshift) and the 6×2 mode to the 6×4 shift (downshift) in a tandem axle assembly using the dual mode hierarchical shift controller 200, 300, further comprising a logic engine which combines information from the axle level control layer 204, 304 with the decision logic from higher layers such as the power source dynamics layer and the transmission override layer to enable various stable states of the dual range axle disconnect system 104 (such as the 6×4 mode of operation, the 6×2 mode of operation, and the double neutral mode).

The method for fully automatic and/or on-demand 6×4 to 6×2 shifts and 6×2 to 6×4 shift in a tandem axle assembly having the vehicle supervisor layer 208, 308 may further comprise a method and apparatus for on-demand shift from the 6×4 mode to the 6×2 mode shift (upshift) and the 6×2 mode to the 6×4 shift (downshift) in a tandem axle assembly using the dual mode hierarchical shift controller 200, 300, further comprising the step of ensuring a system startup in stable states of the dual range axle disconnect system 104 (such as the 6×4 mode of operation, the 6×2 mode of operation, and the double neutral mode), determined using positions of the actuators 128, 132, 140.

The dual mode hierarchical shift controller 200, 300 may also include a logic engine which recognizes specific startup scenarios and execute appropriate recovery actions, a control module (which may be a micro-controller based system with RAM and ROM) which can be configured to provide automatic and/or on-demand axle disconnect and engage operations in the vehicle fitted with the tandem axle assembly 102, at least one input interface (which comprises signal conditioning circuitry) to one or more speed, position, pressure and temperature sensors forming a portion of the vehicle, a connection to the vehicle controller network 216 (which is typically SAE J1939, for monitoring and controlling other vehicle systems such as the power source 108 and/or the transmission 108), at least one output interface (which comprises power driver circuitry) to one or more ON/OFF type pneumatic actuators distributed throughout the vehicle, and a processor connected to the at least one input face and the at least one output interface and memory. The processor is configured to execute a multi-tiered control system software that monitors signals received from the sensors 142, 143, 144, 145, the input interface to determine whether the 6×4 mode of operation or the 6×2 mode of operation is required. The processor then executes a developed finite state machine logic to actuate the actuators 128, 132, 140 to move the tandem axle assembly 102 from a current stable mode of operation to a desired stable mode of operation.

The method for fully automatic and/or on-demand 6×4 to 6×2 shifts and 6×2 to 6×4 shift in a tandem axle assembly, which includes the dual mode hierarchical shift controller 200, 300 comprising of a plurality of shift strategies based upon interaction of components of the tandem axle assembly 102 combined with higher level control strategies of the power source 108 and the transmission 113 to manipulate variables and parameters of the vehicle driveline 100, where conditions the vehicle is operating in require the 6×2 mode of operation. The conditions the vehicle is operating in that require the 6×2 mode of operation include operation of the vehicle at the cruising speed and operation of the vehicle at low to medium grade (in the absence of ABS events, a rain condition, and a snow condition).

The dual range axle disconnect system 104 including the dual mode hierarchical shift controller 200, 300 provides many operational benefits for the vehicle incorporating the dual range axle disconnect system 104, such as, but not limited to, the following conditions:

At lower vehicle speeds, or when the manual override is engaged, or when specified conditions require attention (for example, an ABS event), the dual range axle disconnect system 104 provides the vehicle with:
  A normal power source torque and a normal speed behavior for inching, launching, and acceleration of the vehicle
  A normal clutch function and a normal transmission function under control of the operator of the vehicle
  The 6×4 mode of operation, which provides maximum positive traction for the vehicle
At higher vehicle speeds, such as when the vehicle is operated at or above the cruising speed, including performing traffic maneuvering and traversing of minor grades, the dual range axle disconnect system 104 provides the vehicle with:

A power source operational speed near a desired speed for optimized fuel efficiency at or above the cruising speed An increased power source torque which allows the transmission 113 to remain in a direct gear drive for increased efficiency at or above the cruising speed The 6×2 mode of operation, which provides increased efficiency at or above the cruising speed When accelerating to the cruising speed from lower speeds of the vehicle, the dual range axle disconnect system 104 provides the vehicle with:

A drive torque interruption and restoration which is comparative to an up-shift of the transmission 113

A smooth transition from the 6×4 mode of operation to the 6×2 mode of operation

A smooth transition while increasing a rotational speed of the power source 108

When slowing the vehicle down from the cruising speed to the lower speeds of the vehicle, or when an increased power output is demanded:

A drive torque interrupt and restoration which is comparative to a downshift of the transmission 113

A smooth transition from the 6×4 mode of operation to the 6×2 mode of operation, which allows a rotational speed of the power source 108 to be reduced A smooth transition while decreasing a rotational speed of the power source 108

The dual range axle disconnect system 104 including the dual mode hierarchical shift controller 200, 300 takes into account a plurality of operating conditions of the vehicle to provide an optimal engagement of the rear axle (the axle downshift) and disengagement of the rear axle (the axle upshift).

The dual mode hierarchical shift controller 200, 300 combines logic and digital compensators that cooperate to perform a smooth shift of the dual range axle disconnect system 104. The digital compensators act upon feedback information from the sensors 142, 143, 144, 145 as well as vehicle system variable information obtained from the power source 108, the transmission 113, or other components of the vehicle to provide a phase compensation and a gain compensation to ensure a smooth response. The combined logic and compensator strategy allows the sensing, the actuation, and the control elements to be non-co-located, for example, where the power source is the controlled element and the sensing and actuation occurs at the axle level of the vehicle. This method is different from typical implementation of axle control in which all of the sensing actuation and control happens at the axle level, which may be referred to as co-located control. Another feature of the control strategy implemented by the dual mode hierarchical shift controller 200, 300 is an intermittent nature of compensation which only occurs a shift of the dual range axle disconnect system 104, the compensation remaining inactive at all other times. As a non-limiting example, the compensator structure may be a digital PID (proportional-integral-derivative) controller or a digital transfer function of the 1st, 2nd, 3rd or higher order without PID compensation to achieve the phase compensation and the gain compensation for a desired control behavior.

An objective of the axle control logic and the digital compensation is to manipulate the plurality of control variables to achieve the axle upshift and the axle downshift in a smooth manner. Through control of the power source 108 or the transmission 113, a driveline torque and a driveline speed may be manipulate while ensuring that there are no safety critical vehicle control functions that would preclude a shifts of the dual range axle disconnect system 104. Further, a native bandwidth of the controller 218 of the power source 108 and a controller 219 of the transmission 113 (where applicable) with their associated decision logic must also be taken into account. For example, the controller may have several override modes such as speed control, torque control, or speed/torque limit control. The dual mode hierarchical shift controller 200, 300 has to select the appropriate control mode (to ensure proper range of axle speed and torque values for both upstream and downstream of the synchronizers 150, 152) along with appropriate digital compensators and finite state machine logic, so that the dual mode hierarchical shift controller 200, 300 does not adversely affect responses from the power source 108 or the transmission 113. Also, since upstream dynamic systems such as the power source 108 and the transmission 113 have higher bandwidth, any control manipulation of the power source 108 which may have an effect on axle response requires that the axle control compensators provide an appropriate phase margin and an appropriate gain margin to ensure smooth shifting of the dual range axle disconnect system 104. It is also important for the dual mode hierarchical shift controller 200, 300 to take into account any intermediate dynamics which may occur between the power source 108 and the tandem axle assembly 102.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hierarchical control system for a tandem axle assembly for a vehicle, comprising:
    a vehicle level controller in communication with at least one of a power source and a transmission of the vehicle;
    an actuator in driving engagement with a portion of the tandem axle assembly;
    a shift controller in communication with the vehicle level controller and the actuator, the shift controller comprising a shift strategy layer, the shift strategy layer determining a modulated shift point of a dual range axle disconnect system forming a portion of the tandem axle assembly, the shift controller capable of placing the tandem axle assembly in at least a first operating condition and a second operating condition using the actuator; and
    a sensor in communication with the shift controller, the sensor communicating information about an operating condition of a portion of the tandem axle assembly, wherein in response to the sensor and an operating condition of at least one of the power source and the transmission of the vehicle, the shift controller adjusts a manner of placing the tandem axle assembly in at least one of the first operating condition and the second operating condition.

2. The hierarchical control system according to claim 1, the shift controller further comprising a vehicle supervisor layer, the vehicle supervisor layer monitoring an operation of a dual range axle disconnect system forming a portion of the tandem axle assembly.

3. The hierarchical control system according to claim 1, the shift controller further comprising an axle control layer, the axle control layer performing steps necessary to shift a dual range axle disconnect system forming a portion of the tandem axle assembly, wherein shifting the dual range axle disconnect system places the tandem axle assembly in one of the first operating condition and the second operating condition from a remaining one of the first operating condition and the second operation condition.

4. The hierarchical control system according to claim 1, the shift controller further comprising a boot control layer, the boot control layer ensuring a stable operating state of a dual range axle disconnect system forming a portion of the tandem axle assembly when the shift controller is initiated.

5. The hierarchical control system according to claim 1, the shift controller further comprising a signal processing layer, the signal processing layer implementing a decision logic which allow shifting a dual range axle disconnect system to be automated, the dual range axle disconnect system forming a portion of the tandem axle assembly.

6. The hierarchical control system according to claim 1, the shift controller further comprising a driveline estimation layer, the driveline estimation layer employing an online torque estimation algorithm to determine if the transmission of the vehicle is performing a shift.

7. The hierarchical control system according to claim 1, wherein the shift strategy layer adjusts an operating mode of the transmission to facilitate the shift strategy layer in initiating a shift of the tandem axle assembly.

8. The hierarchical control system according to claim 1, the shift strategy layer further including a shift decision logic module, the shift decision logic module monitoring an operating condition of the power source, the transmission, and the dual range axle disconnect system to facilitate the shift strategy layer in initiating a shift of the tandem axle assembly.

9. The hierarchical control system according to claim 1, the tandem axle assembly further including a front axle, a rear axle, and a dual range axle disconnect system, wherein the dual range axle disconnect system is drivingly engaged with one of the front axle and the rear axle when the tandem axle assembly is placed in the first operating condition and the dual range axle disconnect system is drivingly engaged with both the front axle and the rear axle when the tandem axle assembly is placed in the second operating condition.

10. A hierarchical control system for a tandem axle assembly for a vehicle, comprising:
    a vehicle level controller in communication with at least one of a power source and a transmission of the vehicle;
    an actuator in driving engagement with a portion of the tandem axle assembly;
    a shift controller in communication with the vehicle level controller and the actuator, the shift controller capable of placing the tandem axle assembly in at least a first operating condition and a second operating condition using the actuator, the shift controller including:
        a vehicle supervisor layer, the vehicle supervisor layer monitoring an operation of a dual range axle disconnect system forming a portion of the tandem axle assembly;
        a shift strategy layer, the shift strategy layer determining a modulated shift point of the dual range axle disconnect system; and
        an axle control layer, the axle control layer performing steps necessary to shift the dual range axle disconnect system; and
    a sensor in communication with the shift controller, the sensor communicating information about an operating condition of a portion of the tandem axle assembly, wherein the tandem axle assembly further includes a front axle and a rear axle, the dual range axle disconnect system is drivingly engaged with one of the front axle and the rear axle when the tandem axle assembly is placed in the first operating condition and the dual range axle disconnect system is drivingly engaged with both the front axle and the rear axle when the tandem axle assembly is placed in the second operating condition and in response to the sensor and an operating condition of at least one of the power source and the transmission of the vehicle, the shift controller adjusts a manner of placing the tandem axle assembly in at least one of the first operating condition and the second operating condition.

11. A method of shifting a tandem axle assembly for a vehicle using a hierarchical control system, comprising the steps of:
    providing the tandem axle assembly, the tandem axle assembly including a front axle, a rear axle, and a dual range axle disconnect system, the tandem axle assembly able to be placed in at least a first operating condition and a second operating condition;
    providing a power source and a transmission of the vehicle;
    providing the hierarchical control system, the hierarchical control system including:
        a vehicle level controller in communication with at least one of the power source and the transmission;
        an actuator in driving engagement with a portion of the tandem axle assembly;
        a shift controller in communication with the vehicle level controller and the actuator, the shift controller comprising a shift strategy layer, the shift controller capable of placing the tandem axle assembly in at least the first operating condition and the second operating condition using the actuator; and
        a sensor in communication with the shift controller;
    communicating information collected by the sensor about an operating condition of a portion of the tandem axle assembly to the shift controller;
    communicating information about an operating condition of at least one of the power source and the transmission of the vehicle;
    determining a modulated shift point of the dual range axle disconnected system with the shift strategy layer of the shift controller; and
    adjusting a manner of placing the tandem axle assembly in at least one of the first operating condition and the second operating condition in response to the information collected by the sensor.

12. The method according to claim 11, further comprising the step of monitoring an operation of the dual range axle disconnect system with a vehicle supervisor layer of the shift controller.

13. The method according to claim 11, further comprising the step of performing steps necessary to shift the dual range axle disconnect system with an axle control layer of the shift controller, wherein shifting the dual range axle disconnect system places the tandem axle assembly in one of the first operating condition and the second operating condition from a remaining one of the first operating condition and the second operation condition.

14. The method according to claim 11, further comprising the step of ensuring a stable operating state of the dual range axle disconnect system with a boot control layer of the shift controller when the shift controller is initiated.

15. The method according to claim 11, further comprising the step of implementing a decision logic with a signal processing layer of the shift controller, the decision logic allowing shifting of the dual range axle disconnect system to be automated.

16. The method according to claim 11, further comprising the step of employing an online torque estimation algorithm with a driveline estimation layer of the shift controller to determine if the transmission of the vehicle is performing a shift.

17. The method according to claim 11, further comprising the step of adjusting an operating mode of the transmission to facilitate the shift strategy layer in initiating a shift of the tandem axle assembly.

18. The method according to claim 11, wherein the shift strategy layer further includes a shift decision logic module, the shift decision logic module monitoring an operating condition of the power source, the transmission, and the dual range axle disconnect system to facilitate the shift strategy layer in initiating a shift of the tandem axle disconnect assembly.

* * * * *